US006705827B2

(12) United States Patent
Keller et al.

(10) Patent No.: US 6,705,827 B2
(45) Date of Patent: Mar. 16, 2004

(54) ROBOTIC SEED-HANDLING APPARATUS AND METHODS

(75) Inventors: Douglas O. Keller, Lake Oswego, OR (US); Jonathan Lightner, Mulino, OR (US); Troy M. Swartwood, Tigard, OR (US); Ry Wagner, Eugene, OR (US); Jill Van Winkle, Portland, OR (US)

(73) Assignee: Aagrinomics, LLC, Portland, OR (US)

( * ) Notice: Subject to any disclaimer, the term of this patent is extended or adjusted under 35 U.S.C. 154(b) by 3 days.

(21) Appl. No.: 09/939,333

(22) Filed: Aug. 24, 2001

(65) Prior Publication Data

US 2002/0070150 A1 Jun. 13, 2002

Related U.S. Application Data

(60) Provisional application No. 60/227,898, filed on Aug. 25, 2000, and provisional application No. 60/261,511, filed on Jan. 12, 2001.

(51) Int. Cl.[7] .................................................. B65G 1/00
(52) U.S. Cl. ................... 414/752.1; 414/411; 294/64.1; 901/40
(58) Field of Search ............................ 414/411, 21, 737, 414/752.1; 294/64.1; 901/40; 47/901

(56) References Cited

U.S. PATENT DOCUMENTS

| | | | |
|---|---|---|---|
| 792,958 A | * 6/1905 | Bagger | 221/211 |
| 2,546,838 A | 3/1951 | Tasche | |
| 3,738,530 A | * 6/1973 | Fine et al. | 221/211 |
| 3,929,234 A | 12/1975 | Warren | |
| 3,986,638 A | * 10/1976 | DeHart | 221/150 A |
| 4,106,414 A | * 8/1978 | Vastag | 111/200 |
| 4,228,864 A | * 10/1980 | Berger et al. | 177/145 |
| 4,998,945 A | 3/1991 | Holt et al. | |
| 5,222,854 A | 6/1993 | Blatt et al. | |
| 5,321,212 A | * 6/1994 | Wadell | 177/25.18 |
| 5,350,269 A | 9/1994 | Azuma et al. | |
| 5,385,441 A | 1/1995 | Swapp et al. | |
| 5,414,955 A | 5/1995 | Morin | |
| 5,452,981 A | 9/1995 | Crorey et al. | |
| 5,573,558 A | 11/1996 | Huang | |
| 6,053,220 A | 4/2000 | Lo et al. | |
| 6,150,158 A | * 11/2000 | Bhide et al. | 435/286.3 |
| 6,213,709 B1 | 4/2001 | Hebrank | |
| 6,359,454 B1 | 3/2002 | Khoury | |

FOREIGN PATENT DOCUMENTS

WO  WO 97/20209  6/1997

* cited by examiner

*Primary Examiner*—Donald P. Walsh
*Assistant Examiner*—Joseph C Rodriguez
(74) *Attorney, Agent, or Firm*—Klarquist Sparkman, LLP

(57) ABSTRACT

Robotic apparatus for transferring and distributing small particles, such as seeds, contained in covered or uncovered containers, such as capped jars, are disclosed. An exemplary apparatus includes a vacuum-activated probe configured to pick up a selected number of seeds from a donor container and to deposit the seeds in a selected recipient container. The seeds being transferred may be weighed during the transfer process by depositing the seeds in a crucible of a microgram balance or analogous device. After weighing, the seeds are picked up using a second probe that transfers the seeds to a recipient container. Also disclosed are automated methods for transferring and weighing particles, such as seeds.

45 Claims, 16 Drawing Sheets

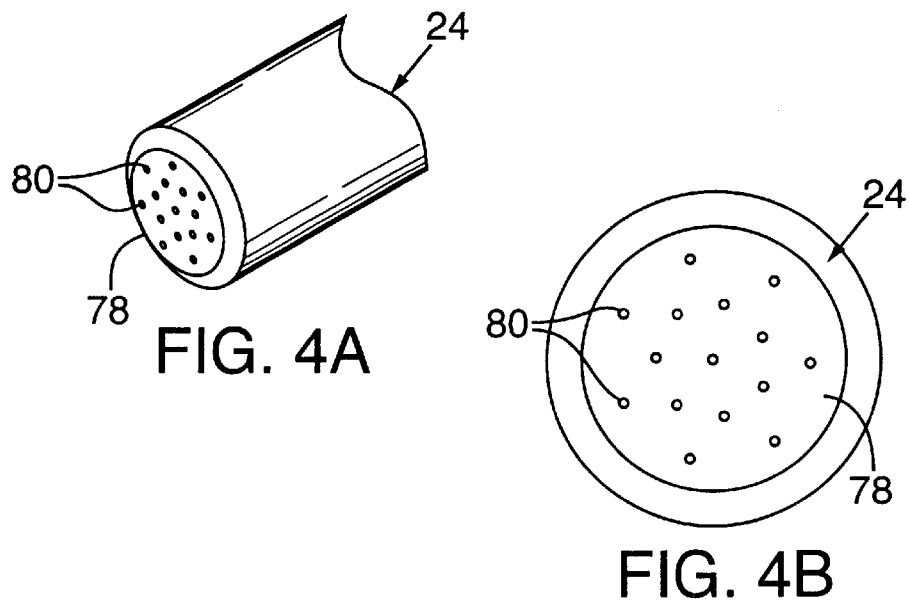
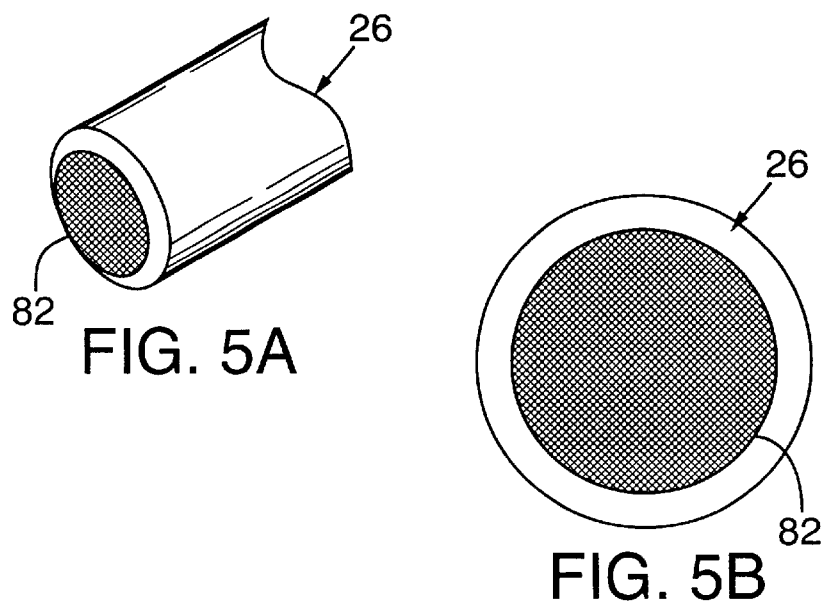

ROBOTIC SEED-HANDLING APPARATUS AND METHODS

CROSS REFERENCE TO RELATED APPLICATIONS

This application claims priority to U.S. provisional application No. 60/227,898, filed Aug. 25, 2000, and U.S. provisional application No. 60/261,511, filed on Jan. 12, 2001, which are incorporated herein by reference in their entirety.

FIELD

The present invention relates to robotic apparatus and methods for automatically transferring small articles, such as seeds, between donor and recipient locations (e.g., respective containers) and optionally, for weighing the transferred articles.

BACKGROUND

Many types of horticultural and agricultural operations, both in a research and in a production context, involve manipulations of plant seeds and other units of plant reproductive material. For example, certain operations involve seed sorting, seed weighing, and analogous tasks. These tasks are labor-intensive and repetitive.

The scale of modern horticultural operations, as well as other operations involving propagation of plants, is continuing to increase. With large-scale horticultural operations, it is readily appreciated that tasks such as seed manipulation, sorting, and weighing ordinarily require large numbers of monotonous man-hours for completion. The enormous time and labor costs associated with these tasks can be prohibitive.

Hence, there is a need for automated equipment capable of performing any of various horticulturally related tasks such as seed sorting and weighing.

SUMMARY

According to one representative embodiment, a robotic apparatus for handling particles, such as seeds, is provided. A robotic assembly of the apparatus is configured to move in three-dimensional space. A particle manipulator is carried by the robotic assembly to be the positioned by the robotic assembly at selected locations in the three-dimensional space. The particle manipulator includes a probe having an apertured end surface, in which each aperture is dimensioned smaller than a particle. The probe is fluidly connectable to a vacuum source so that application of a vacuum from the vacuum source to the probe is effective to cause the end surface of the probe to pick up particles whenever the end surface of the probe is positioned at a selected first location proximate to the particles. Release of the vacuum from the probe causes the end surface of the probe to release the particles at a selected second location, which can be the same or different from the first location. To facilitate release of the particles from the end surface of the probe, the probe may be fluidly connected to a pressurized fluid source for selectively introducing a pressurized fluid into the probe.

The apparatus also may include a cover-removal manipulator for removing and replacing a cover on a container containing the particles. The cover-removal manipulator may be carried by or mounted to the robotic assembly, along with the particle manipulator, to be the positioned by the robotic assembly at selected locations in the three-dimensional space. Alternatively, the cover-removal manipulator and the particle manipulator may be configured to move independently of each other on their own respective robotic assemblies. In addition, a particle-weighing device situated and configured to receive particles from the probe for weighing may be provided.

In one particular embodiment, the end surface of the probe includes a plate defining a selected number of apertures. Each aperture is dimensioned smaller than a particle, and the number of apertures corresponds to the number of particles to be picked up at one time by the probe. Thus, application of the vacuum is effective to cause the probe to pick up approximately one particle per aperture. In an alternative configuration, the end surface of the probe comprises a mesh screen having a mesh size smaller than a particle. Application of the vacuum to the probe is effective to cause the meshed surface to pick up one or more particles.

In an illustrated embodiment, the particle manipulator includes a first probe and a second probe. The first probe has an end plate defining a selected number of openings for picking up a corresponding selected number of particles upon application of vacuum to the probe. The second probe has a fine-mesh end surface that is capable of picking up an undefined number particles, which can be larger than the selected number of particles picked up by the first probe.

The apparatus also may include a particle-donor area and a particle-receiving area. The particle-donor area is configured to accommodate at least one donor container, and the particle-receiving area is configured to accommodate at least one recipient container. In this embodiment, the robotic assembly is configured to move the particle manipulator to the donor area to pick up particles from the donor container with the probe and to move the particle manipulator to the particle-receiving area to deposit particles from the probe in the recipient container.

In addition, a cleaning station for cleaning debris from the probes may be provided. In one form, the cleaning station includes a housing that defines first and second ports configured for receiving the first and second probes, respectively. The housing is connectable to a pressurized fluid source for introducing a pressurized fluid into the housing for removing debris from the probes inserted into their respective ports.

According to another representative embodiment, a robotic apparatus is provided for moving particles from a first container to a second container. The apparatus includes a cover-removal manipulator for removing and replacing covers on the containers and a particle manipulator for removing particles from the first container. The particle manipulator includes a probe having an end surface defining at least one opening dimensioned smaller than a particle. The probe is connectable to a vacuum source so that application of a vacuum from the vacuum source to the probe is effective to cause the end surface of the probe to pick up particles whenever the end surface of the probe is positioned in the first container proximate to the particles. In addition, the particle manipulator is configured to move the probe to the second container for depositing the seeds removed by the probe from the first container. To release the particles in the second container, the vacuum is released from the probe.

According to yet another representative embodiment, an apparatus is provided for removing seeds from a donor container. A robot means is configured to move in three-dimensional space. A seed-manipulator means is carried by the robot means. The robot means is configured to position the seed-manipulator means at a selected location in three-dimensional space so as to allow the seed-manipulator means to remove a selected one or more seeds from the donor container. A control means is operatively connected to the robot means and to the seed-manipulator means. The control means is configured to receive user input specifying the donor container from which one or more seeds are to be removed, to cause the robot means to move the seed-manipulator means to a selected location in three-dimensional space such that the seed-manipulator means is positioned to remove one or more seeds from the specified donor container, and to activate the seed-manipulator means to pick up one or more seeds from the specified donor container.

In another representative embodiment, an apparatus is provided for weighing one or more articles and for transferring the articles between recipient and donor containers. A transfer area of the apparatus has a surface for supporting donor and recipient containers thereon. A robotic assembly is configured for movement over the surface of the transfer area. A probe device is carried by the robotic assembly. The probe device is configured for picking up and releasing a sample number of articles in respective containers at selected positions in the transfer area. The probe device includes a first probe and a second probe. The first probe has a first-probe end plate defining a selected number of openings corresponding to the number of articles to be picked up by the first probe. Application of vacuum to the first-probe end plate is effective to pick up approximately one article per opening. The second probe has a second-probe end plate comprising a fine-mesh screen capable of picking up an undefined number, generally larger than the selected number, of articles. In addition, a weighing station is provided for receiving one or more articles therein from either of the first and second probes, and for weighing the received articles.

A method for transferring plant seeds (as representative particles) from a donor container to a recipient container, according to one embodiment, comprises positioning a first probe at a first position to remove seeds from the donor container. The first probe comprises a probe plate defining a selected number of openings configured to pick up a corresponding selected number of seeds from the donor container. A vacuum is applied to the first probe to cause the first probe to pick up the corresponding number of seeds. After seeds are picked up by the first probe, the first probe is positioned at a second position to deposit the seeds into the recipient container. The vacuum is then released from the first probe to cause the seeds to be released into the recipient container.

In an alternative method, the seeds removed from the donor container are weighed before being deposited into the recipient container. In a more specific approach for transferring and weighing seeds, the first probe, with picked-up seeds, is moved to a weighing device prior to depositing the picked-up seeds in the recipient container. At the weighing device, the vacuum is released from the first probe to cause the picked-up seeds to be deposited onto the weighing device, at which point the seeds may be weighed by the weighing device. After the seeds are weighed, a second probe having a fine-mesh end surface is positioned proximate to the seeds on the weighing device. The mesh surface has a number of openings larger than the number of openings in the probe plate of the first probe. A vacuum is applied to the second probe to cause the second probe to pick up substantially all the seeds from the weighing device. The second probe is then positioned at the second position to deposit the seeds into the recipient container, and the vacuum is released from the second probe to cause the second probe to release the seeds into the recipient container.

These and other objects and features of the invention will be more fully appreciated when the following detailed description of the invention is read in conjunction with the accompanying drawings.

BRIEF DESCRIPTION OF THE DRAWINGS

FIGS. 4A and 4B show the end portion of the first probe according to one embodiment.

FIGS. 5A and 5B show the end portion of the second probe according to one embodiment.

DETAILED DESCRIPTION

The methods for handling seeds with the robotic apparatus described herein may be implemented in software stored on a computer-readable medium and executed on a general-purpose computer. For clarity, only those aspects of the software germane to the invention are described; product details well known in the art are omitted. For the same reason, the computer hardware is not described in further detail. In addition, the software can be implemented as hardware. It should thus be understood that the invention is not limited to any specific computer language, program or computer.

Figure 1:
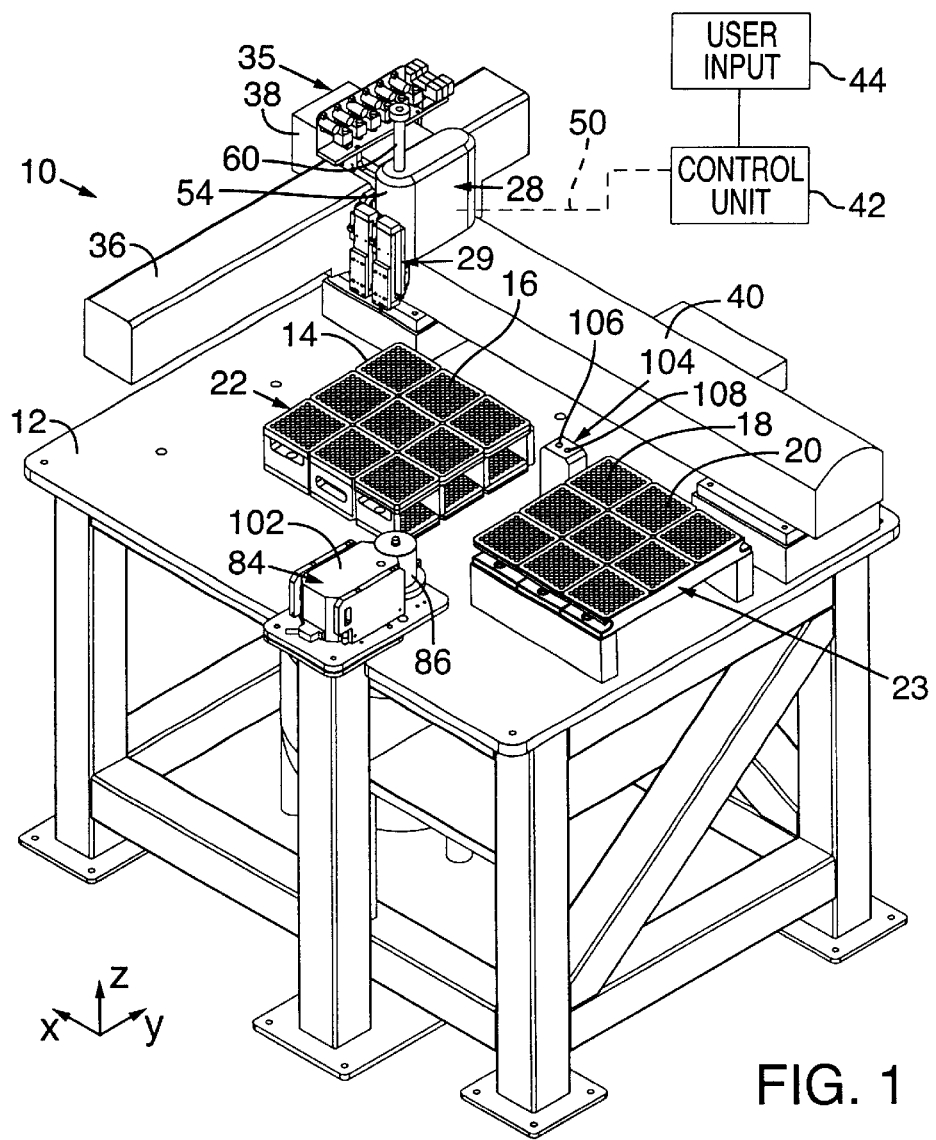
FIG. 1 is a perspective view of a seed-transfer and weighing apparatus configured according to one embodiment.
Figure 2:
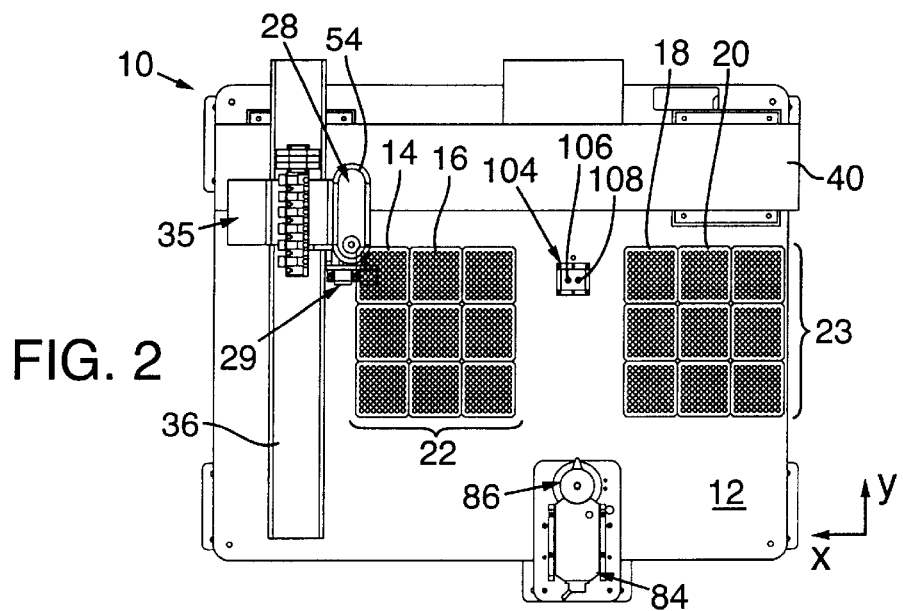
FIG. 2 is a plan view of the apparatus in FIG. 1, shown here loaded with nine donor (population) and nine recipient (sample) containers, each containing 64 jars, or tubes.

Referring first to FIGS. 1 and 2, there is shown a robotic apparatus 10 according to one embodiment for transferring or otherwise manipulating small articles (such as seeds) and, optionally, weighing the transferred seeds. FIGS. 1 and 2 show perspective and plan views, respectively, of apparatus 10. Although the following description of apparatus 10 proceeds with reference to handling seeds, apparatus 10 may be adapted for use in transferring, distributing, weighing, or otherwise handling any of various other small articles.

As shown, apparatus 10 generally includes a support, such as base plate 12, for supporting a plurality of donor, or population, containers that contain seeds to be transferred and recipient, or sample, containers for receiving transferred seeds. The support serves as a transfer area in which seeds are transferred from donor containers to recipient containers. A weighing apparatus may be positioned within or adjacent to the transfer area for optionally weighing the transferred seeds, as described in greater detail below.

The donor and recipient containers may comprise jars or tubes, which are carried by suitable support structures, such as donor boxes 18, 20 and recipient boxes, such as boxes 14, 16. As best shown in FIG. 1, the top of each box may comprise a respective horizontally supported plate having apertures sized to receive individual jars or tubes.

Figure 7:
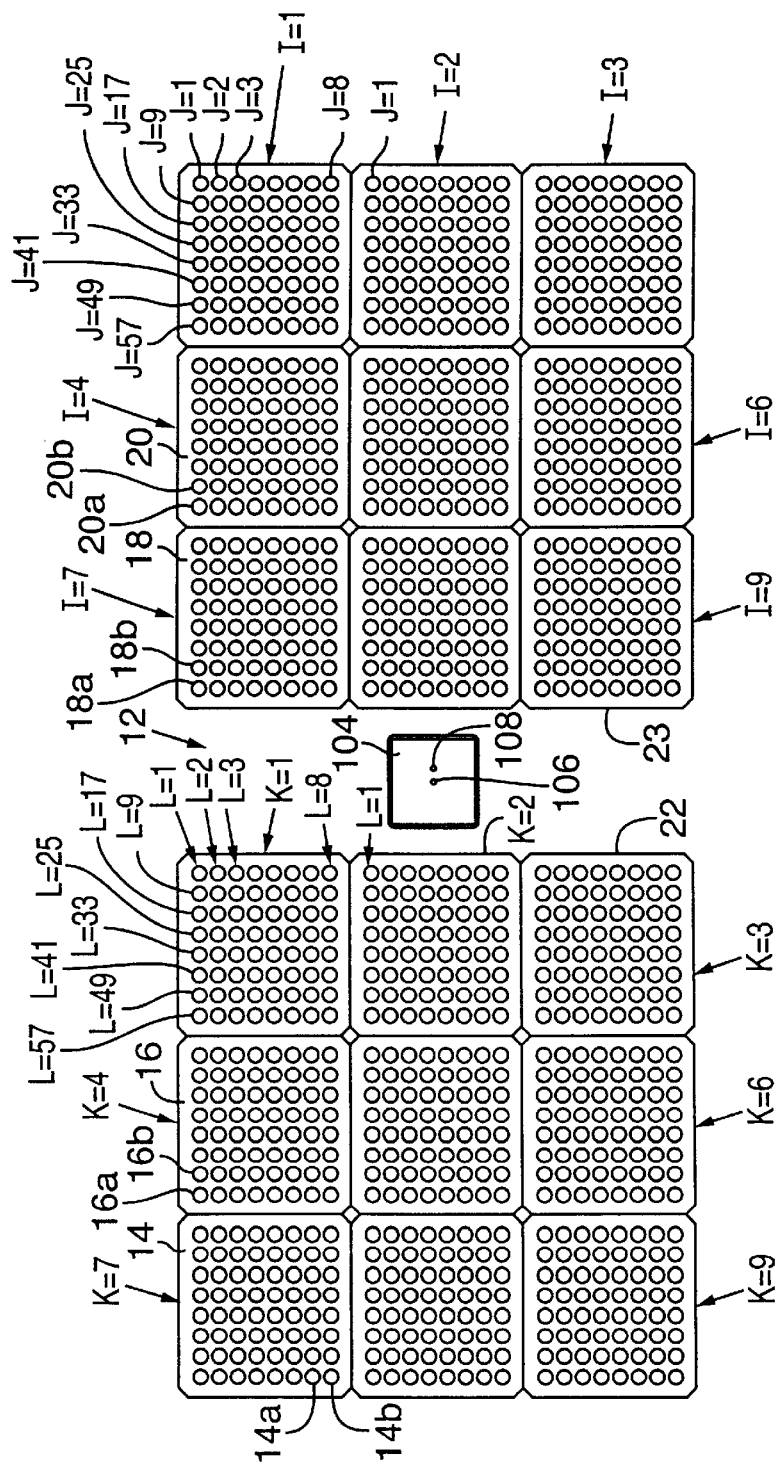
FIG. 7 is a plan view of sample boxes and tubes, showing respective numbering of the boxes and tubes for purposes of operating the apparatus as detailed in FIGS. 8–12.

In the embodiment shown, the support 12 supports a 3×3 array 23 of donor boxes and a 3×3 array 22 of recipient boxes. As seen in FIG. 7, each donor box in array 23 is identified by a box number K=1 to K=9, progressing in a top-to-bottom, right-to-left direction. Each recipient box in array 22 is similarly identified by a box number I=1 to I=9, progressing in a top-to-bottom, right-to-left direction. Each donor and recipient box is supported at known x-y coordinates on the stage, the x-y-z axes being indicated in FIG. 1 and the x-y axes being indicated in FIG. 2. Thus, by specifying a given box number, the x-y coordinates, and therefore the position of that box may be determined.

Each donor and recipient box in the illustrated embodiment contains an 8×8 array of 64 jars, although boxes sized to hold a different number of jars also may be used. The jars are held at known x-y coordinates within each box, such as by suitable dividers within each box (e.g., apertured plates). Although not shown here, each jar may contain a side or bottom wall tab that interacts with a corresponding tab slot in its respective box to anchor the jar against rotational movement within the box. As seen in FIG. 7, each jar in a donor box is identified by a jar number J=1 to J=64, progressing in a top-to-bottom, right-to-left direction. Each jar in a recipient box is similarly identified by a jar number L=1 to L=64, progressing in a top-to-bottom, right-to-left direction. Thus, by specifying the jar position number of a jar, and the box number of the jar, the x-y coordinates, and therefore the position of that jar may be determined.

The containers may comprise standard seed-sample jars, which typically hold up to several hundred seeds per jar. The containers may have covers or caps, such as screw-on or twist-on caps, corks or rubber stoppers, or any of various other suitable coverings that serve to shield and/or capture the seeds within the containers. In addition, other forms of containers also may be used. For example, the containers may comprise cavities or wells formed in the surface of a plate. For the purposes of illustrating the cap-removal feature of apparatus 10, the containers in the illustrated embodiment comprise jars adapted for receiving a twist-on cap or cover, such as capped jars 18a, 18b in donor box 18 and jars 20a, 20b in box 20, as shown in FIG. 7.

Apparatus 10 includes a robotic assembly operable to move in three-dimensional space. In the illustrated embodiment, for example, the robotic assembly is configured to move in Cartesian x, y, and z directions relative to the support. However, the space in which the robotic assembly moves may be defined by other coordinate systems, such as a polar coordinate system.

The robotic assembly may be adapted to remove and replace caps from donor and recipient containers and then transfer seeds from donor containers to recipient containers.

Figure 3:
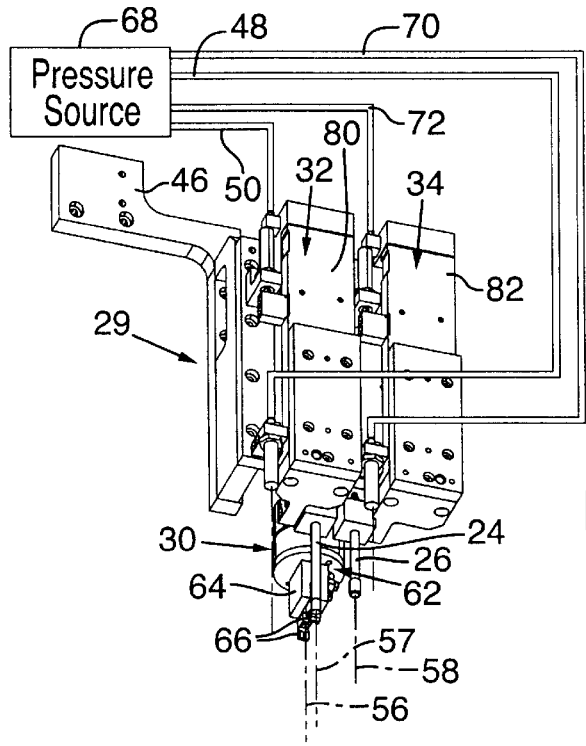
FIG. 3 shows details of the manipulator assembly of the apparatus of FIG. 1, including a cover-removal manipulator and a probe device for picking up and releasing seeds.

As shown in FIGS. 1 and 2, for example, a robotic head assembly 28 comprises a manipulator assembly 29 mounted to a support 54. FIG. 3 shows the manipulator assembly 29 with the support 54 removed for clarity. The manipulator assembly 29 in the illustrated configuration includes a cover-removal manipulator 30 for removing and replacing a cover on a jar at a selected x-y-z position, and one or more seed manipulators, such as a first seed manipulator 32 and a second seed manipulator 34, for picking up and releasing seeds at a selected x-y-z position. The first and second seed manipulators 32 and 34 are each independently movable in the z-direction and have first and second probes 24 and 26, respectively, that are operable for picking up and depositing seeds, as will be described more fully below.

Other forms for the robotic assembly also may be used. For example, if the apparatus is used in connection with only uncovered containers, the cover-removal manipulator 30 may be optional. Still alternatively, the cover-removal manipulator 30 and each of the first and second seed manipulators 32, 34, respectively, may be mounted for independent movement relative to each other on their own respective movable head assemblies.

Assembly 28 is movable to selected x-y positions with respect to support 12. For example, as shown in FIGS. 1 and 2, assembly 28 is mounted to or carried by a carriage 35. Carriage 35 includes an assembly mount 38 on which the robotic head assembly 28 is mounted. The assembly mount 38 is mounted for translational movement along a track 36 extending in the y-axis direction parallel to the plane of support 12 for positioning assembly mount 38, and thereby head assembly 28, at a selected y-axis coordinate. Track 36, with assembly mount 38 and head assembly 28, are mounted for translational movement along a track 40 which extends in an x-axis direction parallel to the plane of support 12 for positioning head assembly 28 at a selected x-axis coordinate. The movement of the carriage 35 along track 40 and movement of assembly mount 38 along track 36 to selected x-y coordinates are controlled by suitable drive mechanisms (not shown) operatively connected to the carriage 35 and assembly mount 38, as is well known is the art. The drive mechanisms may comprise, for example, belt coupled motors, linear electromagnetic motors, or the like.

Suitable drive mechanisms also are provided for moving the cover-removal manipulator 30 and probes 24 and 26 individually to selected z-axis positions (i.e., toward and away from the surface of support 12) during operation of the apparatus. These drive mechanisms are conventional, and well known to those of skill in the art.

Control of the drive mechanisms to place assembly 28 at selected x-y coordinates and to place each of manipulator 30 and each probe 24, 26 at a selected z-axis coordinate is through a control unit 42 (FIG. 1) operatively connected to the robotic assembly at 50. As shown, control unit 42 desirably receives user input 44. The construction of control unit 42, either as a hard-wired processor or software driven processor, will be appreciated from the description of the operation of the control unit described below with reference to FIGS. 8–12.

FIG. 3 is an enlarged perspective view of manipulator assembly 29, showing details of the cover-removal manipulator 30 and the first and second seed manipulators 32, 34, respectively. Manipulator 30 is carried on the lower end of a slide rod 60 (FIG. 1) for movement therewith as the slide rod 60 is raised and lowered along a z-axis 56 (FIG. 3) to selected z-axis positions. The first and second seed manipulators 32 and 34 are mounted to bracket 46. Each of the first and second seed manipulators 32, 34 comprises a respective slide 80, 82 coupled to respective probes 24, 26. Movement of slides 80, 82 causes movement of their respective probes 24, 26 along z-axes 57, 58, respectively. As noted above, the movements of manipulator 30 and each of probes 24, 26 along their respective z-axes are independently controlled by respective drive mechanisms under the control of control unit 42.

Construction and translational control of the three z-direction drive mechanisms can be conventional. In the illustrated embodiment, for example, slides 80, 82 are air-actuated slides. As shown in FIG. 3, compressed air from pressure source 68 is supplied to slide 80 via lines 48 and 50 and to slide 82 via lines 70 and 72. Compressed air from lines 50 and 72 causes downward movement of the associated slide, while compressed air from lines 48 and 70 causes upward movement of the associated slide.

With continued reference to FIG. 3, cover-removal manipulator 30 includes a head 62 mounted on the lower end of rod 60 (FIG. 1). A clamp 64 is mounted on the lower end of the head 62 and is configured for rotational movement of the clamp 64 about a vertical z-axis 56 relative to the head 62. Clamp 64, in turn, has a pair of clamping jaws 66 designed to move toward and away from one another to clamp and release, respectively, the outer rim of a cap on a sample jar of the type described above. For example, the cap has an outer diameter of about 1.5 to 3 cm, and is completely screwed on or off the threads of a jar with about one to two full rotations of the clamp 64. The jaws of the clamp 64 may be covered with an inner elastomeric material to accommodate slight variations in cap diameters, and to provide greater frictional contact with the caps. Drive mechanisms for moving clamping jaws 66 toward and away from one another, and for rotating clamp 64 a desired angular distance about z-axis 56 are conventional and under the control of control unit 42. To remove a cover from a jar, the jaws 66 are moved into position to engage the cover, and the clamp 64 with jaws 66 are rotated, for example, in the counter-clockwise direction. An anti-rotational tab of the jar prevents rotation of the jar as the clamp is rotated so as to permit rotation of the cover relative to the jar.

The first probe 24 is coupled to slide 80 for movement toward and away from support 12 along z-axis 57. The first probe 24 is in fluid communication with a vacuum source (not shown) and, optionally, a source of high-pressure gas (e.g., 90 psig) and a source of low-pressure gas (e.g., 1–2 psig) (not shown), such as respective compressed air sources. Control of vacuum and compressed gas to slide 80 is provided by a suitable valving arrangement, such as solenoid-actuated valves, connected to the vacuum and pressure sources and under the control of control unit 42.

Figure 13:
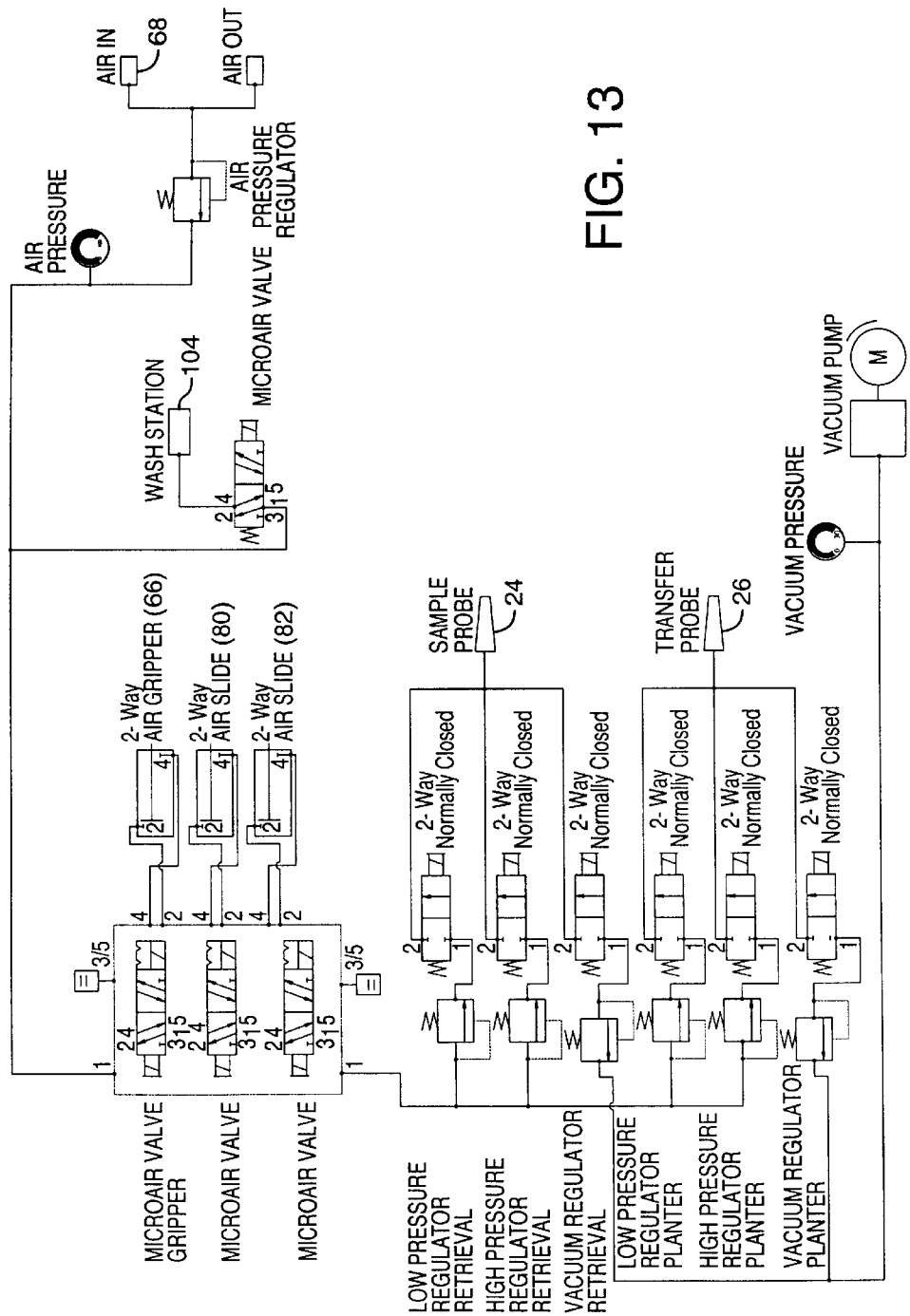
FIG. 13 is a valving schematic for the vacuum and compressed air sources according to one embodiment.

The second probe 26 is likewise coupled to slide 82 for movement toward and away from support 12 along z-axis 58. The second probe 26 also is in fluid communication with the vacuum source and, optionally, the sources of high- and low-pressure compressed gas (e.g., air), through a suitable valving arrangement. FIG. 13 is a diagram showing one example of a valving schematic for the vacuum and compressed air sources supplying slides 80, 82; probes 24, 26; and clamping jaws 66.

The first probe 24 is adapted to pick up a selected "sample" number of seeds when the head of the first probe 24 is inserted into a seed jar near or in contact with the upper surface of seeds in the jar, and a vacuum is applied to the probe. With reference to FIGS. 4A and 4B, first probe 24 has a probe plate 78 defining a selected number of openings, such as openings 80. With application of a vacuum to the first probe 24, and when the probe plate 78 is positioned over seeds, approximately one seed per opening will be drawn against the plate 78. The number of seeds picked up by the probe 24 may be slightly more or fewer than the number of openings, however, on average, the first probe 24 will pick up a selected number of seeds that approximately corresponds to the number of openings. Thus, as used herein, whenever a probe "picks up" a seed or other particle, the seed is immobilized at a corresponding aperture without passing through the aperture.

In the embodiment shown, the plate 78 has fifteen openings. As a result, a seed pick-up operation will result in up to about 15 seeds being picked up by the probe 24. Of course, a probe having more or fewer openings may be used depending on the number of seeds that are required to be transferred in a single pick-up operation. The probe plate 78 has a typical diameter between 3–5 mm, although larger or smaller plates are contemplated, depending on seed size and number of seeds to be picked up. The openings in the plate 78 are typically about 100–150 microns in diameter, and may be vary somewhat depending on seed size. The above opening sizes are suitable, for example, for seeds of *Arabidopsis thaliana*, which are about 230–260 microns in diameter, and have a per-seed mass of about 15–25 micrograms. Of course, those skilled in the art will realize that the specific dimensions for the first probe 24 provided above (as well as other dimensions provided in the present application) are given to illustrate the invention and not to limit it. These dimensions can be modified as needed in different applications or situations. By way of further example, the opening sizes described above are within a size range appropriate for manipulating seeds from any of various genera from the family Orchidaceae.

When apparatus 10 is used to transfer seeds directly from a donor jar to a recipient jar, without seed weighing, the first probe 24 with its picked up seeds may be moved with assembly 28 from a selected x-y position of a donor jar to a selected x-y position of a recipient jar for deposit of the seeds into the selected recipient jar. If the seeds are to be weighed during transfer, the first probe 24 is moved to a weighing station 84 where the seeds are released from the first probe 24 and weighed, as further discussed below. After weighing, the seeds are picked up by the second probe 26 for transfer from the weighing station 84 to a selected recipient jar.

With reference to FIGS. 5A and 5B, second probe 26 has a lower probe surface 82 which comprises a fine-mesh screen. With application of a vacuum to the second probe 26, and when the probe surface 82 of the second probe 26 is positioned over a sample of seeds (e.g., 5–50 seeds in a small-diameter vessel), all of the seeds will be drawn against and captured by the probe. The mesh surface typically has the same outer-diameter dimensions as plate 78, and a typical mesh size of mesh size of about 10–20 openings/ $mm^2$. Each opening in such a mesh is smaller than the dimensions of a seed to prevent passage of seeds through the mesh surface. Of course, the size of the mesh employed in probe 26 may be varied depending on the size of the seeds that are being handled. For example, a relatively larger mesh size with smaller openings may be used for smaller seeds and relatively smaller mesh size with larger openings may be used for larger seeds.

The second probe 26 with its mesh surface lends itself to picking up seeds more efficiently than the first probe 24. Thus, the second probe 26 typically is used to pick up seeds that have been deposited in the weighing apparatus and to place the seeds in a recipient container. In cases where weighing of seeds is not required, the apparatus may be provided with only the first probe 24 and the second probe 26 may be optional.

The seeds are released from either of the probes 24, 26 for deposition into a selected recipient jar, or at the weighing station, by release of the vacuum to the respective probe. Seed release may be facilitated by application of a low-pressure fluid (e.g., 1–2 psig compressed air) to the probe from the compressed gas source.

FIGS. 1 and 2 show the weighing station 84 at which seeds being transferred between donor and recipient jars may be weighed. As shown in particularly FIG. 6A, a representative embodiment of the weighing station 84 includes a chamber 86 formed of a cylindrical wall 88 disposed on a base 90. Cylindrical wall 88 has a two-member construction which allows side access to the chamber by rotation of one wall member relative to the other member on base 90. A top plate 92 of the enclosure is provided with a plug or stopper 94 which can be removed to provide probe access to the chamber in the direction of the z-axis of the probe.

Figure 6A:
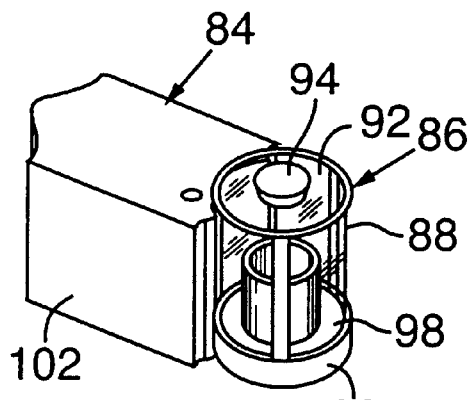
FIG. 6A is a perspective view of the weighing station in the apparatus of FIGS. 1 and 2.
Figure 6B:
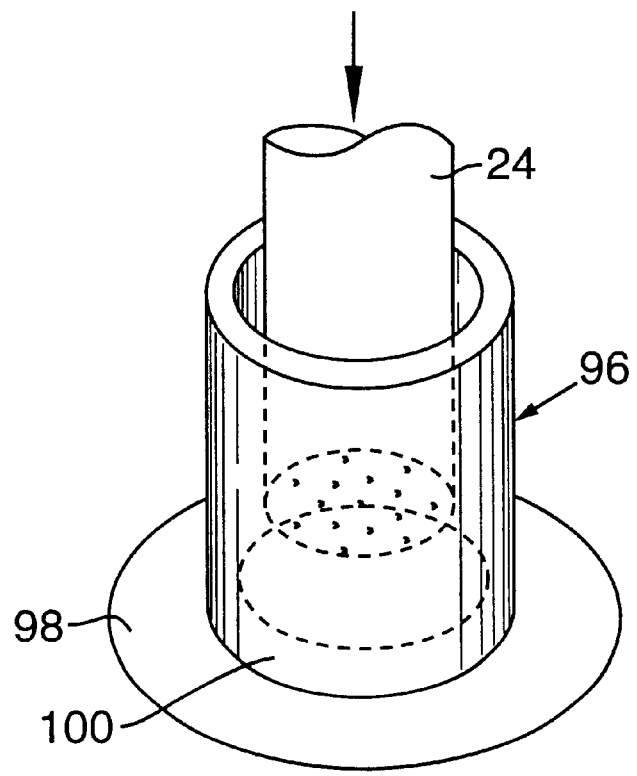
FIG. 6B is a perspective view showing details of the balance crucible shown in FIG. 6A.

As shown in FIG. 6B, weighing station 84 comprises a weighing crucible 96 composed of a lower weighing pan 98 and a cylindrical wall member 100. Crucible 96 is dimensioned to receive a seed pick-up probe, such as probe 24 or probe 26, therein for depositing or removing seeds into or from the bottom of the crucible. The weighing pan 98 of the crucible 96 is supported on a balance or scale 102 (FIGS. 1 and 6A) configured for weighing objects usually in a mass range between about 0.1 to 2000 micrograms, and more typically between about 10–500 micrograms. The balance 102 includes conventional weighing and recording electronics, and preferably a side-access mechanism. In addition, the balance 102 is operatively connected to the control unit 42 for controlling the side-access mechanism noted above, and for recording weighings made at particular cycles in the operation of the apparatus, as will be considered below.

Completing the description of the embodiment shown in FIGS. 1 and 2, the apparatus further includes a cleaning station 104 that comprises a housing having a pair of ports 106, 108 for receiving the ends of probes 24, 26 therein. The ports 106, 108 are connected to a compressed gas source for selectively applying compressed gas (e.g., compressed air) to the probes 24, 26 for purposes of removing any seed debris remaining on the probes between successive seed-transfer operations. Alternatively, the probes 24, 26 may be subjected to a stream of compressed gas outside of any housing, although this may be less desirable in that any seed debris removed from the probes will not be contained for disposal. In another embodiment, the ports 106, 108 are filled with a cleaning solution. In the latter configuration, additional ports may be provided for drying the probes 24, 26 by, for example, applying compressed gas to the probes or flowing a hot gas over the probes.

In a working embodiment of apparatus 10, the robotic assembly comprises a Seiko Cartesion model XM3106B11, which includes a robotic head assembly to which the cover manipulator 30 and the first and second seed manipulators 32 and 34 are mounted. Also, the balance comprises a Mettler Toledo model UMX2 balance, which is modified to include a cover 92 with a centrally disposed stopper 94, and a crucible 96, such as shown in FIGS. 6A and 6B.

FIGS. 8–12 are flow diagrams showing the operation of apparatus 10 in its various seed-transfer and weighing modes. Initially, as shown at input block 110 in FIG. 8, the user resets the states of the control unit 42, for example, by entering the time, date, user and seed-source information that will become part of the seed-transfer and weighing record generated. The user then selects at decision block 112 one of two basic seed-transfer operations carried out by the apparatus. One mode of operation is referred to as a "pooled samples" mode and the other is referred to as an "individual samples" mode.

In the "pooled samples" mode, a sample number of seeds (e.g., 15 seeds) from each of a plurality of donor jars in a designated donor box is transferred to a single recipient jar in a designated recipient box. The seeds collected in a single recipient jar are referred to as a pooled sample. If the user selects this mode, the control unit program (either software or hard-wired program) proceeds to the program steps given in FIGS. 9A and 9B and described below.

In contrast, in the "individual samples" mode, a sample number of seeds from each of one or more individual donor jars of a designated donor box is transferred to one or more corresponding recipient jars, so that each recipient jar contains seeds from only one donor jar of a designated donor box. A recipient jar corresponds to a donor jar if the recipient jar is at the same numerical position in its recipient box as the donor jar in its donor box. For example, recipient jar 1 of a recipient box corresponds to donor jar 1 of a donor box, recipient jar 2 corresponds to donor jar 2, and so on. Similarly, a recipient box corresponds to a donor box if the recipient box is at the same numerical position within array 22 as the donor box with array 23.

In one specific transfer operation of the individual samples mode, a sample number of seeds from one or more donor jars of one or more donor boxes are transferred to the corresponding recipient jars of corresponding recipient boxes. In this transfer operation, seeds from a designated donor box are transferred to the corresponding jars of only one recipient box. In another transfer operation, one or more seeds from one or more donor jars of one donor box are transferred to corresponding recipient jars of more than one recipient box. These transfer operations are further described below with reference to FIGS. 10A, 10B, and 11.

Although not shown here, the user will also indicate whether the transferred seeds are to be weighed. If this selection is made, the apparatus will execute the additional weighing steps specified in the seed-weighing subroutine shown in FIG. 12D. The seed-weighing subroutine can be executed in either the pooled samples or individuals samples mode. As will be discussed below, the weighing step desirably is executed after seed pick-up from a donor jar, and before seed deposit in a recipient jar. In addition, the user will indicate whether donor and/or recipient tubes are covered. If one or both are uncovered, then the control unit will ignore the cover removal steps applicable to that jar.

In the flow diagrams, several variables are specified by the operator and/or tracked by the program in a seed transfer operation. For purposes of illustration, the variables discussed herein are with respect to the 3×3 box arrays, 64 jars-per-box configuration described above and illustrated in FIG. 7. It will be recognized that the range of box and jar numbers may be varied for other jar and box array configurations. For the pooled samples mode, the variables are defined as follows:

1. "X" is the number of boxes to be sampled, that is, the number of donor boxes containing jars which are to be combined in a pooled sample, where $1 \leq X \leq 9$;
2. "S" is the number of jars or cells in each donor (or population) box X that will be used to make a pooled sample, where $1 \leq S \leq 64$;

3. "Y" is the number of samples, that is, the number of recipient (or sample) jars that will contain seeds pooled from the donor jars, where $1 \leq Y \leq 64$;
4. "I" is a counter that represents the number of the current donor (or population) box from which seeds are being taken, where $1 \leq I \leq 9$;
5. "J" is a counter that represents the number of the current donor (or population) jar or cell of donor box I from which seeds are being taken, where $1 \leq J \leq 64$;
6. "K" is a counter that represents the number of the current recipient (or sample) box into which seeds are being deposited, where $1 \leq K \leq 9$;
7. "L" is a counter that represents the number of the current recipient (or sample) jar or cell of recipient box K, where $1 \leq L \leq 64$; and
8. "M" is the counter for the number of recipient jars of a recipient box that have received a complete seed sample.

Figure 9A:
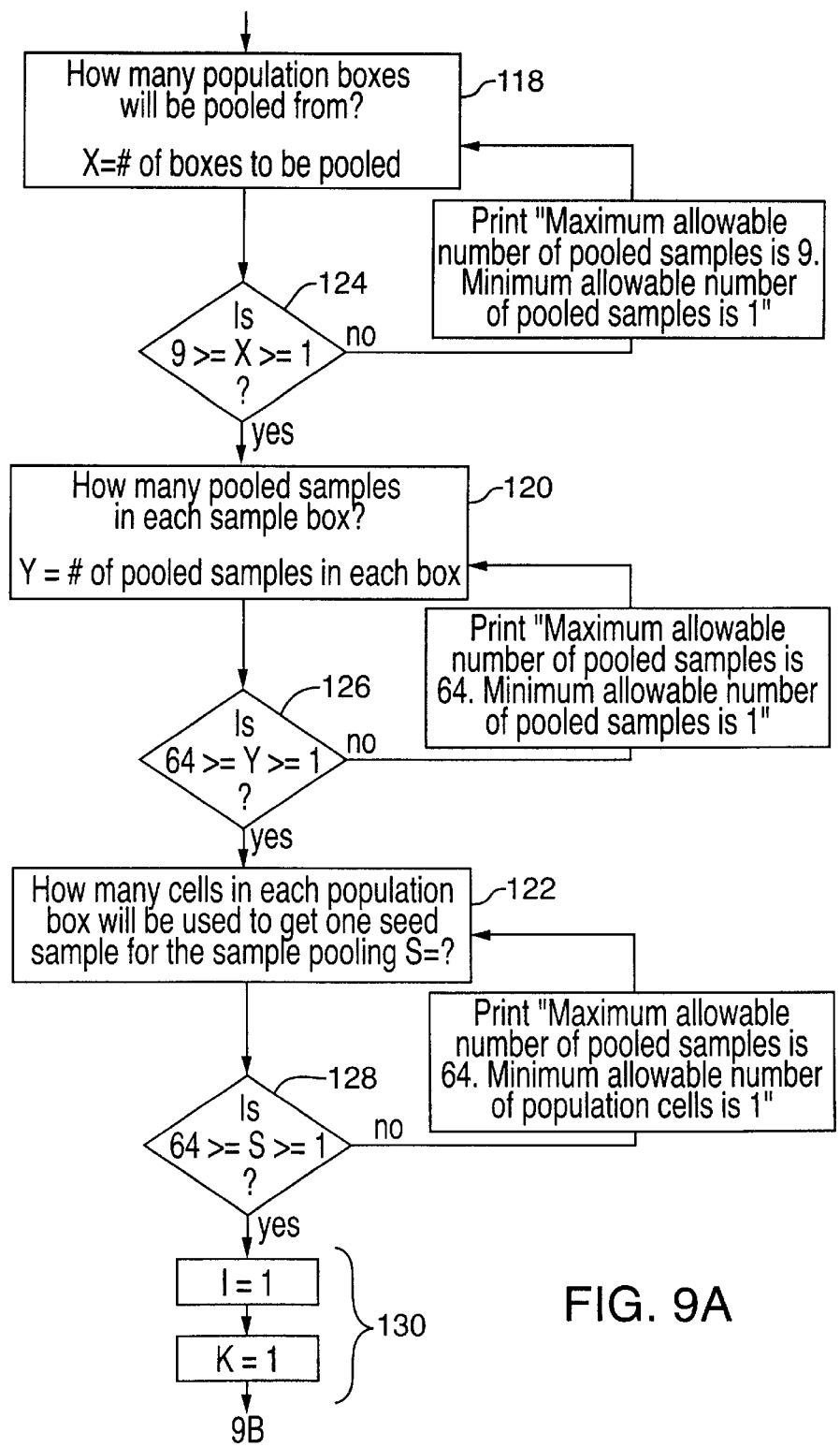
FIGS. 9A and 9B are a flow diagram of the seed-transfer steps in a pooled seed-transfer operation.
Figure 9B:
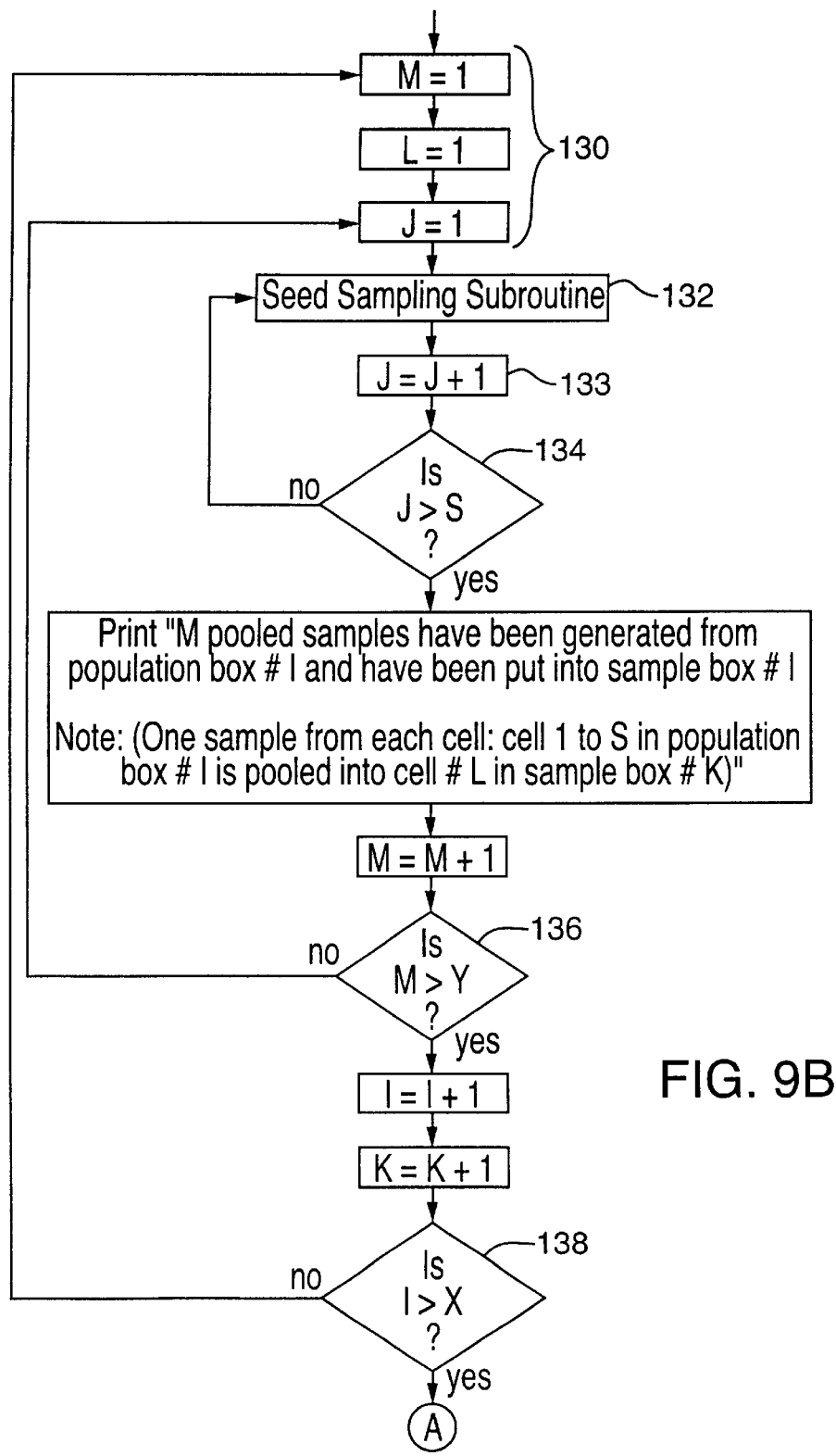

With reference to FIGS. 9A and 9B, in the pooled sample mode, the user specifies values for "X", "Y", and "S" at 118, 120, and 122 respectively, and the program confirms, at 124, 126, and 128, respectively, that a proper number range has been selected. The program initializes I, K, M, L, and J to one, as indicated generally at 130, then proceeds to the first seed transfer, using a seed-sampling subroutine indicated at process block 132 (FIG. 9B) which will be detailed below with reference to FIGS. 12A–12C. The first transfer step operates to transfer a sample number of seeds from the first donor jar (J=1) in the first box (I=1) to the first recipient jar (L=1) in the first recipient box (K=1). The value of J is incremented, as indicated at 133, and the procedure is repeated for each successive donor jar in box 1, up to jar J=S, as indicated at 134, transferring a selected number of seeds of each donor jar (1 through S) to recipient jar 1 in recipient box 1. The value of M is then incremented and the procedure repeated for each additional recipient jar (1 through Y), until a total of Y recipient jars in recipient box K=1 have received a pooled sample from donor box I=1. When this condition is met, as indicated at 136, the program increments I (the donor box number) and K (the recipient box number) and the procedure is repeated for up to eight additional donor boxes in which seeds from S donor jars in a donor box X are collected in each of Y jars in a recipient box. The transfer procedure is complete when I>X, as indicated at 138.

Referring again to FIG. 8, the individual-samples mode will now be described. For the individual-samples mode, the program variables are defined as follows:
1. "X" is the number of donor boxes having jars from which seeds are to be taken, where $1 \leq X \leq 9$;
2. "S" is the number of jars in a donor box X from which seeds are to be transferred, where $1 \leq S \leq 64$;
3. "Y" is the number of recipient boxes in which the recipient jars are to receive seeds from corresponding donor jars of a single donor box X, where $1 \leq Y \leq 9$;
4. "I" is a counter that represents the number of the current donor (or population) box from which seeds are being taken, where $1 \leq I \leq 9$;
5. "J" is a counter that represents the number of the current donor (or population) jar or cell of donor box I from which seeds are being taken, where $1 \leq J \leq 64$;
6. "K" is a counter that represents the number of the current recipient (or sample) box into which seeds are being deposited, where $1 \leq K \leq 9$;
7. "L" is a counter that represents the number of the current recipient (or sample) jar or cell of recipient box K, where $1 \leq L \leq 64$; and
8. "M" is the counter for the number of donor jars S from which seeds have been transferred to corresponding recipient jars.

Figure 8:
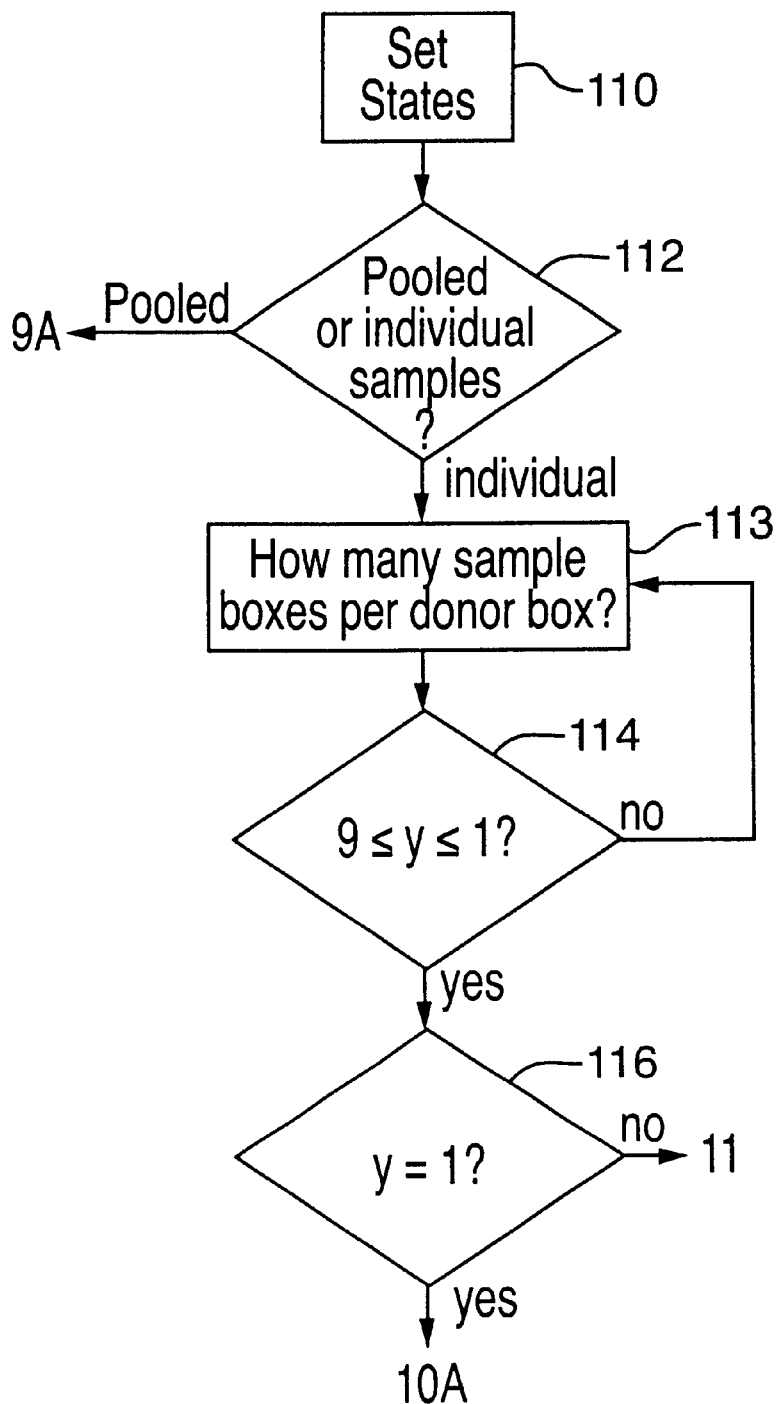
FIG. 8 is a flow diagram of the initial processor operations of the apparatus control unit.

If the individual samples mode is selected at decision block 112 of FIG. 8, the user specifies at input block 113 the number of recipient boxes Y in which the recipient jars are to receive seeds from corresponding donor jars of a single donor box. If the number of recipient boxes selected is "1", the program proceeds to the steps shown in FIGS. 10A and 10B, described below. Alternatively, if the number of recipient boxes selected is 2–9, the program proceeds to the steps given in FIGS. 11A and 11B.

Figure 10A:
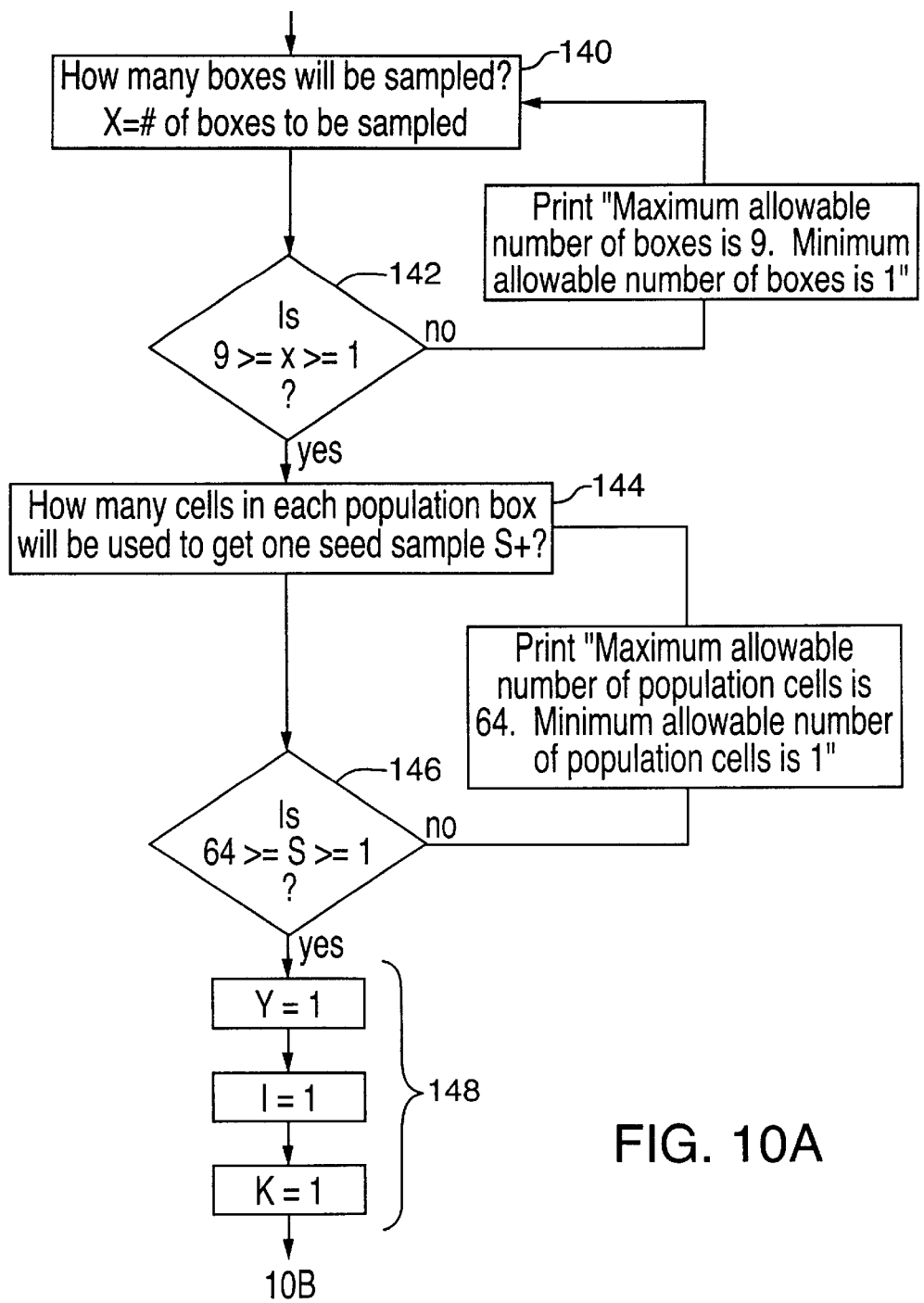
FIGS. 10A and 10B are a flow diagram of the seed-transfer steps in an individual seed-transfer operation, where seeds in a donor jar are transferred to a single recipient jar.
Figure 10B:
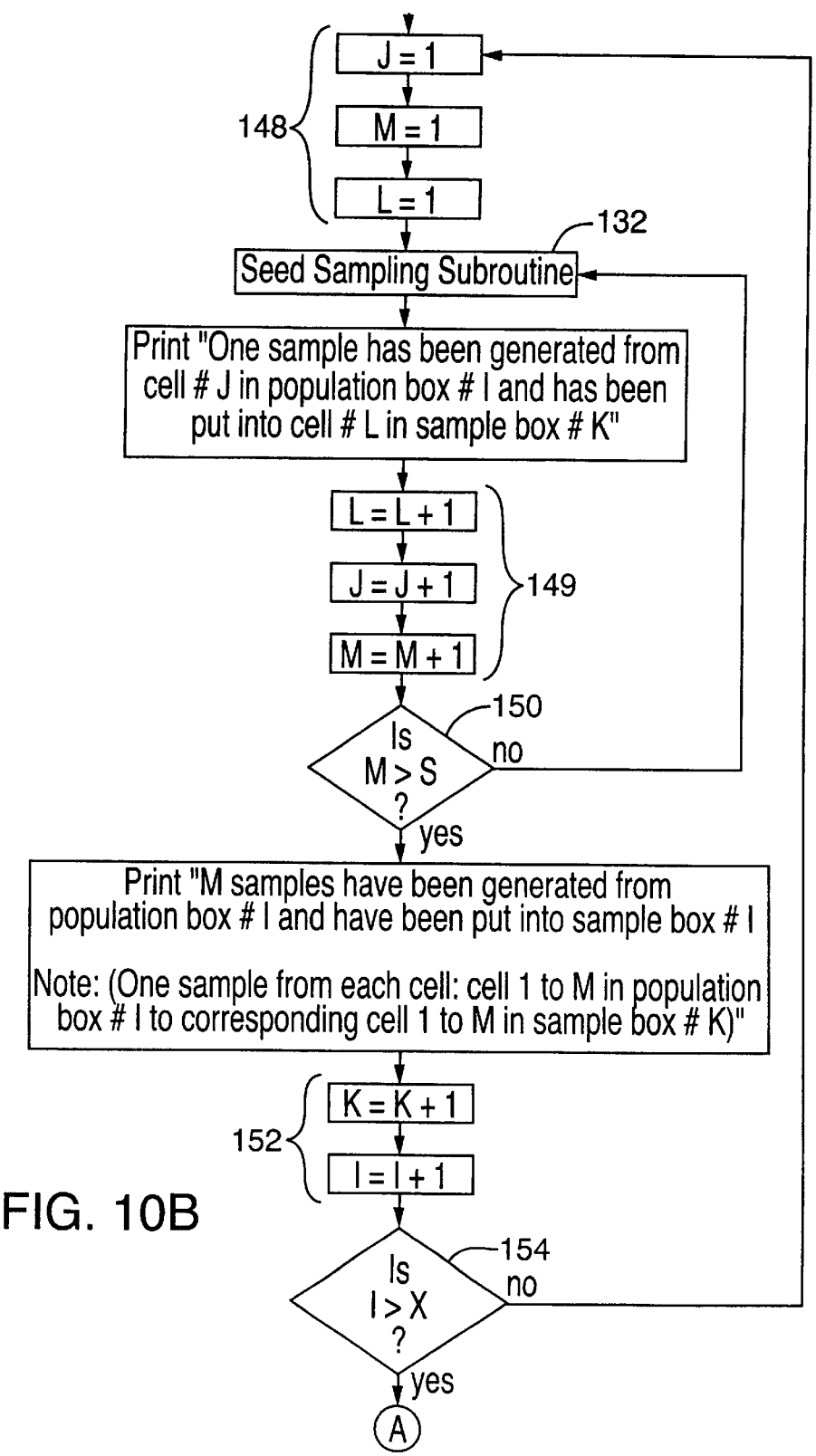

FIGS. 10A and 10B show a flow diagram of an individual seed-transfer operation where seeds from one or more donor jars of one or donor boxes are transferred to corresponding recipient jars in corresponding recipient boxes. In this manner, the seed distribution in the donor box(es) is duplicated in corresponding recipient box(es), but with each recipient jar containing a small number of seeds (e.g., approximately 15 seeds in the present example).

As shown in FIG. 10A, the user specifies values for "X" and "S" at 140, 144, respectively, and the program confirms, at 142, 146, respectively, that a proper number range has been selected. The program initializes Y, I, K, J, M, and L to one, as indicated generally at 148 in FIGS. 10A and 10B, then proceeds to the first seed transfer, using the seed-sampling subroutine, as indicated at 132 in FIG. 10B to transfer seeds from donor cell J=1 of box I=1 to recipient cell L=1 of box K=1. As indicated generally at 149, the program now increments J, the donor cell number, L, the recipient cell number, and the counter M. The one-to-one transfer operation is continued for each donor jar (1 through S) until the counter M>S, as indicated at 150, at which point seed transfer from cells in the first donor box to corresponding cells in the first recipient box is complete. At this point, the values of I (the donor box number) and K (the recipient box number) are incremented, as indicated generally at 152. The one-to-one transfer operation is repeated for the second donor and recipient boxes, then the third donor and recipient boxes, and so forth, until a seed sample from the donor jars (1 through S) of all donor boxes (1 through X) has been transferred, that is, where I>X, as indicated at 154.

Figure 11:
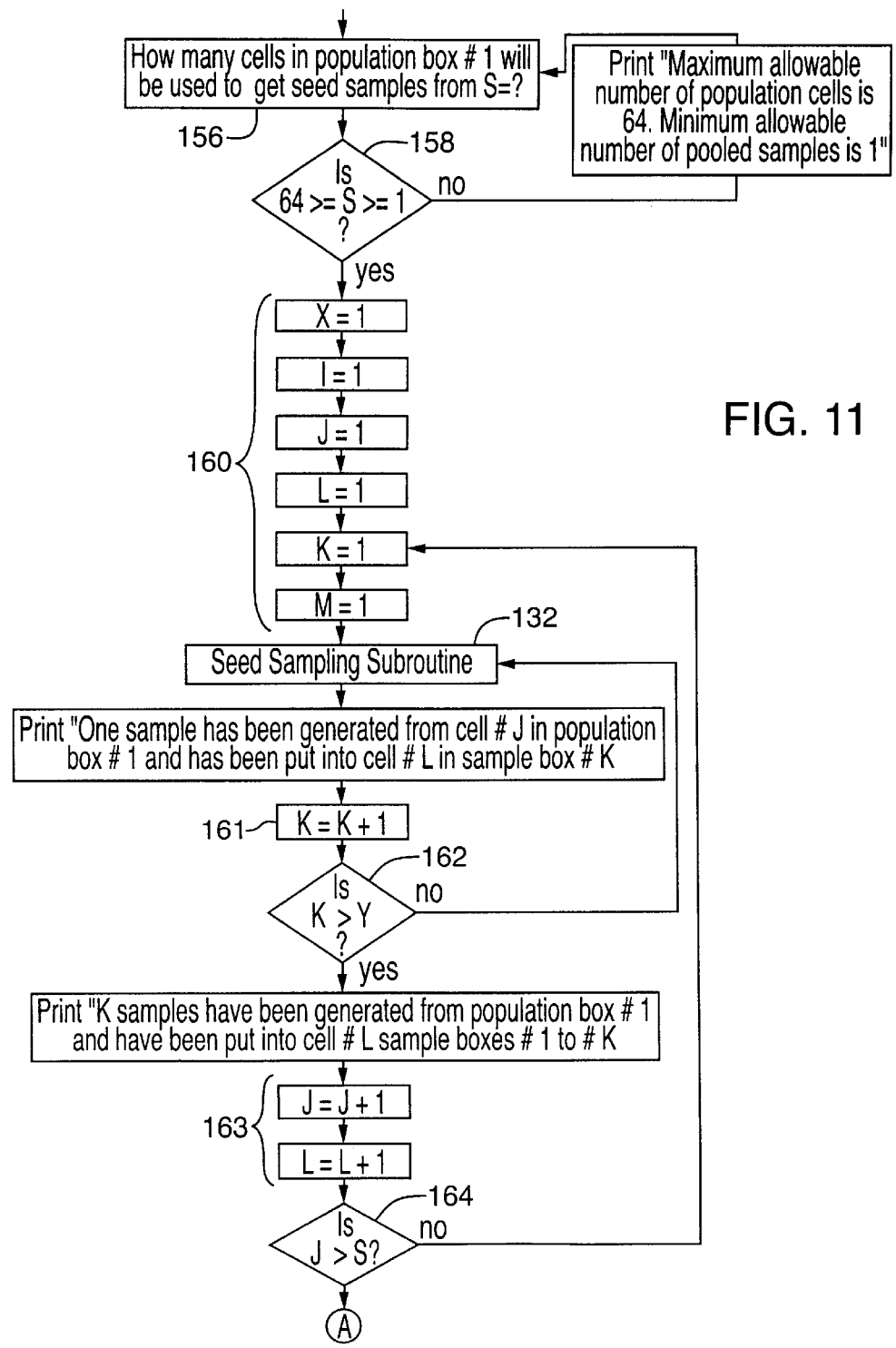
FIG. 11 is a flow diagram of the seed-transfer steps in an individual seed-transfer operation, where seeds in a donor jar are transferred to multiple recipient jars.

FIG. 11 is a flow diagram of an individual seed-transfer operation where seeds from one or more donor cells of the first donor box are transferred to corresponding recipient cells in two or more recipient boxes. In this manner, there is a one-to-one correspondence between seeds in a specified donor cell in the first recipient box and the same cell number in two or more (up to nine) recipient boxes.

In this mode, the user specifies a value for "S" at 156, and the program confirms, at 158, that a proper number range ($1 \leq S \leq 64$) has been selected. It is noted, in addition, that the user has previously selected $Y \geq 2$ for the number of duplicate samples which are to be created for each donor cell in the first recipient box 1 (i.e., the number of recipient boxes in which the recipient jars are to receive seeds from corresponding donor jars of the first donor box).

The program initializes X, I, J, L, K, and M to one, as indicated generally at 160, then proceeds to the first seed transfer, using the seed-sampling subroutine at 132 to transfer seeds from donor jar I of donor box 1 to recipient jar 1 of recipient box 1. The program now increments K (the recipient box number) at 161 and makes a seed transfer from donor jar 1 of donor box 1, to recipient jar 1 of recipient box 2, etc. This process is repeated until seeds from donor jar 1 of donor box 1 have been distributed to corresponding recipient jar 1 in each of the Y (up to nine) recipient boxes, that is, until K>Y, as determined at 162. J (the donor cell number) and L (the corresponding recipient cell number) are now incremented, as indicated generally at 163, and the seed-transfer process is repeated for the other donor jars of donor box 1 until the condition J>S is reached, as indicated at 164.

Figure 12A:
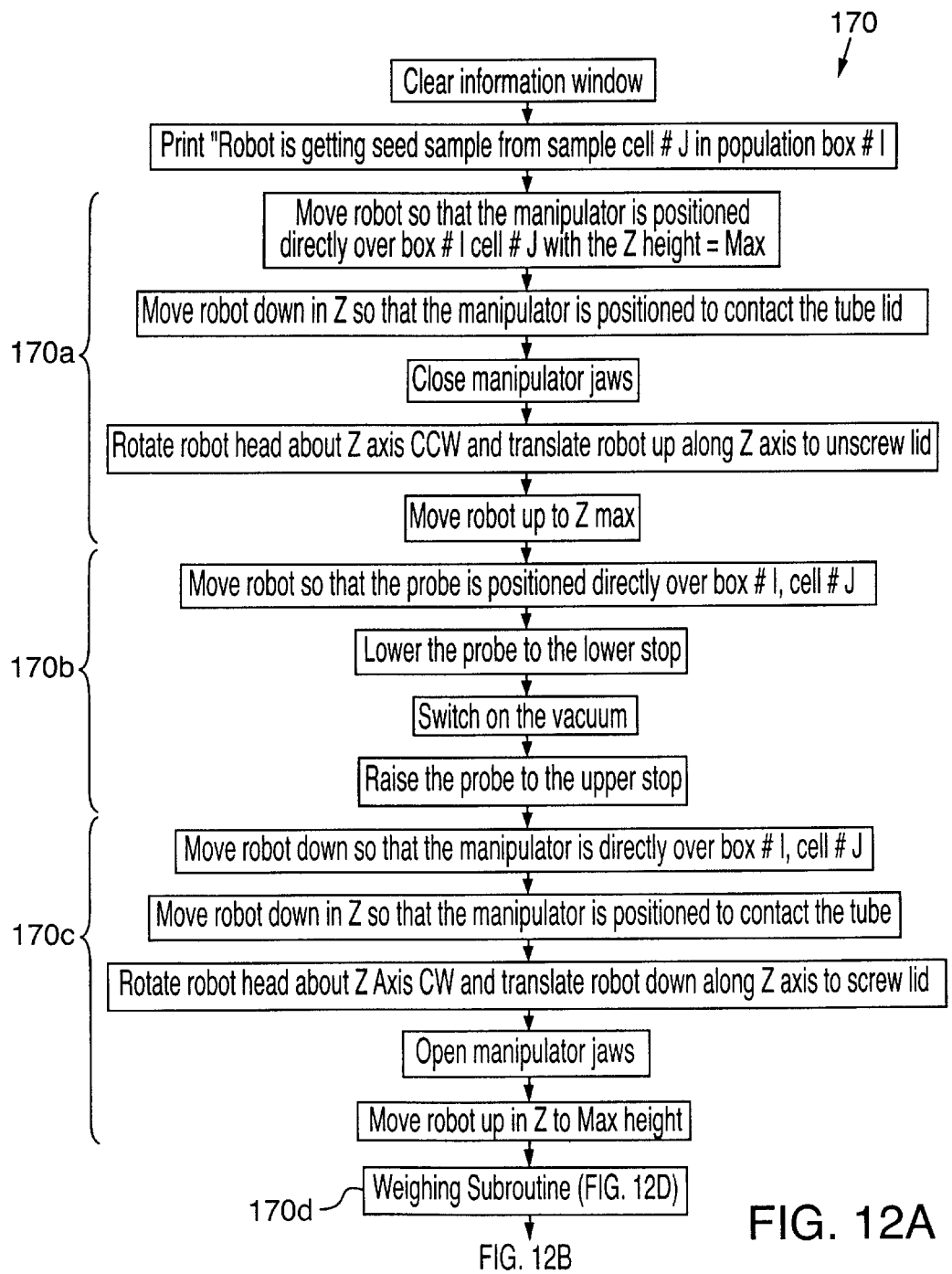
FIGS. 12A–12C are a flow diagram of various aspects of the seed-sampling subroutine of FIGS. 9B, 10B and 11.
Figure 12B:
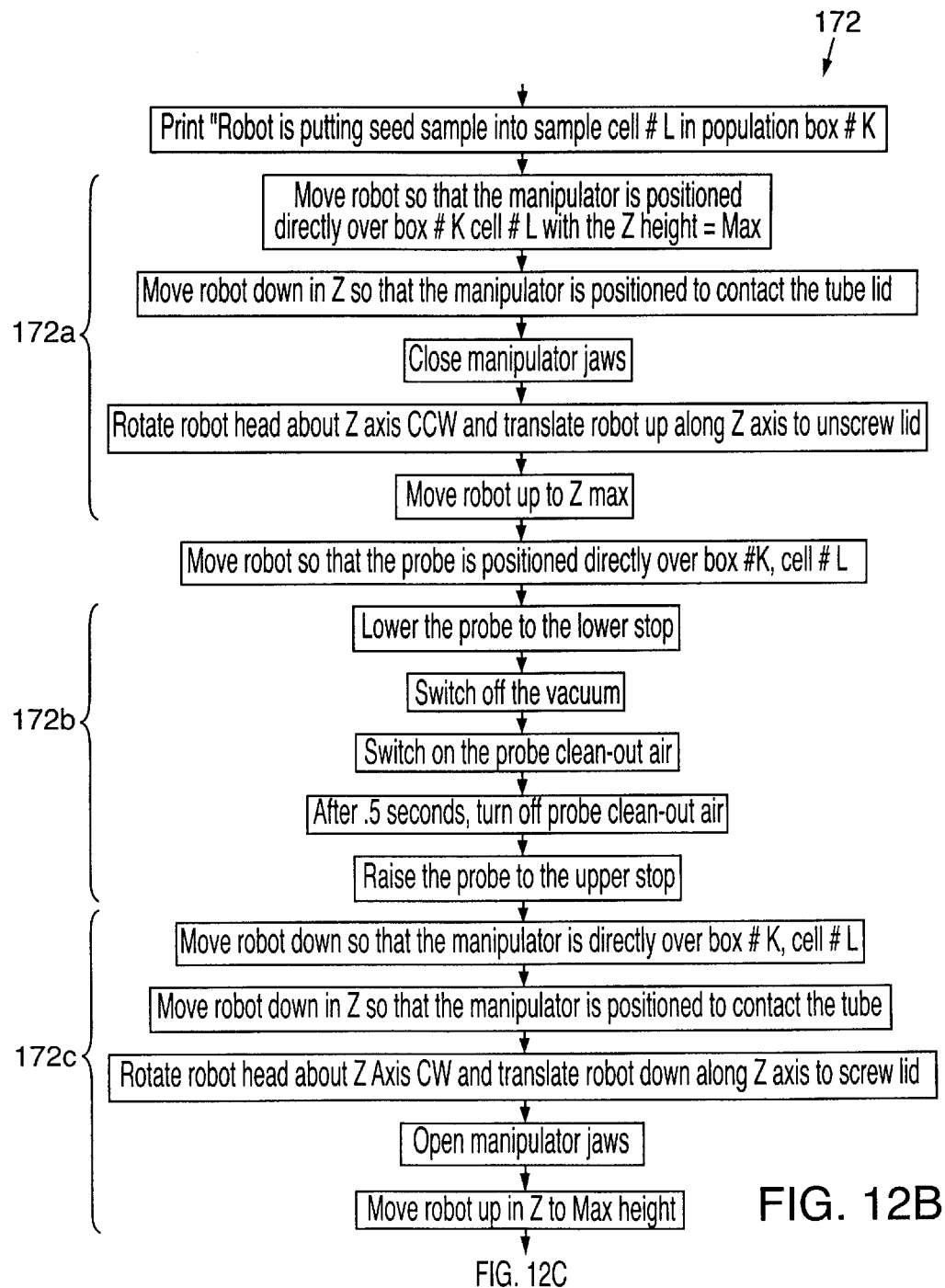
Figure 12C:
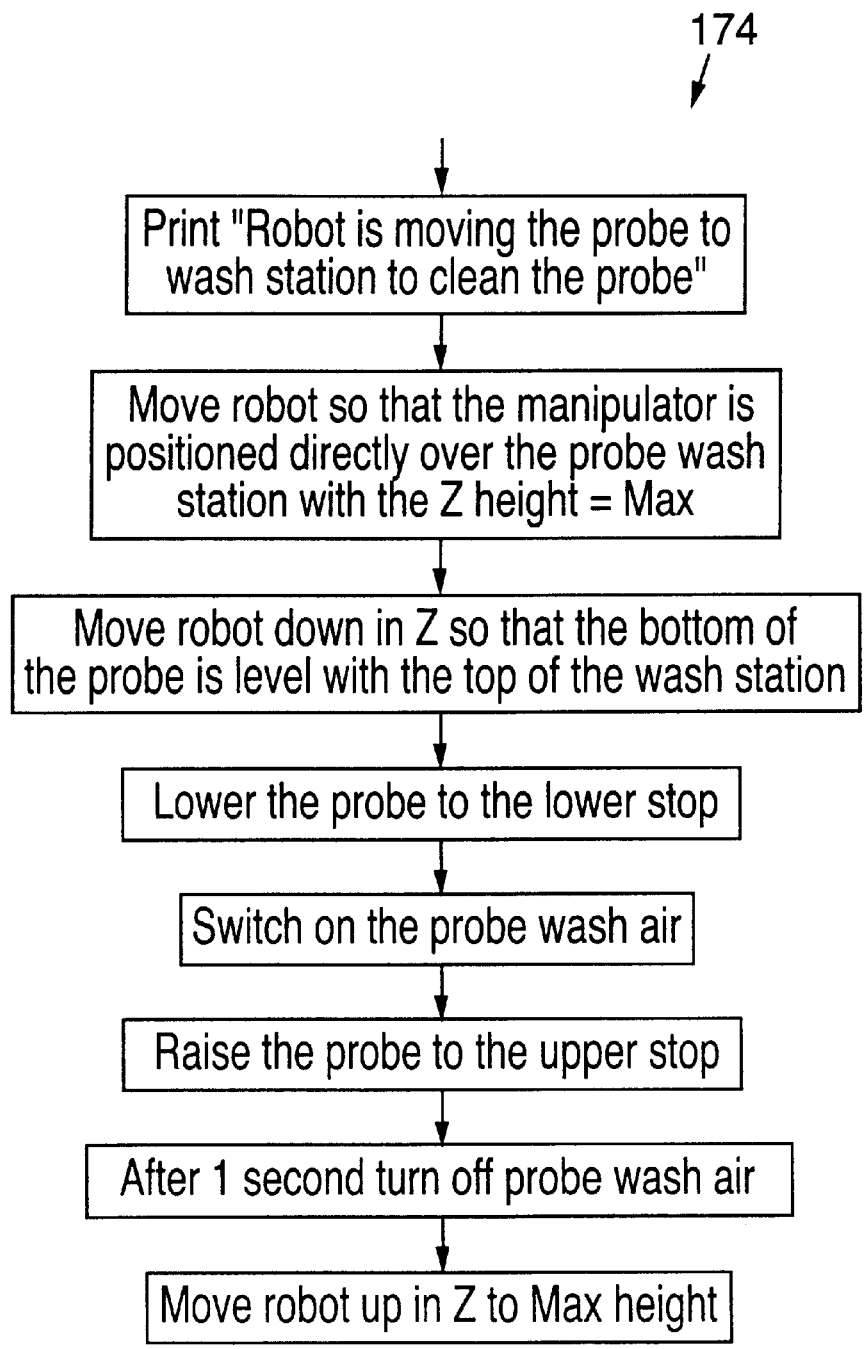
Figure 12D:
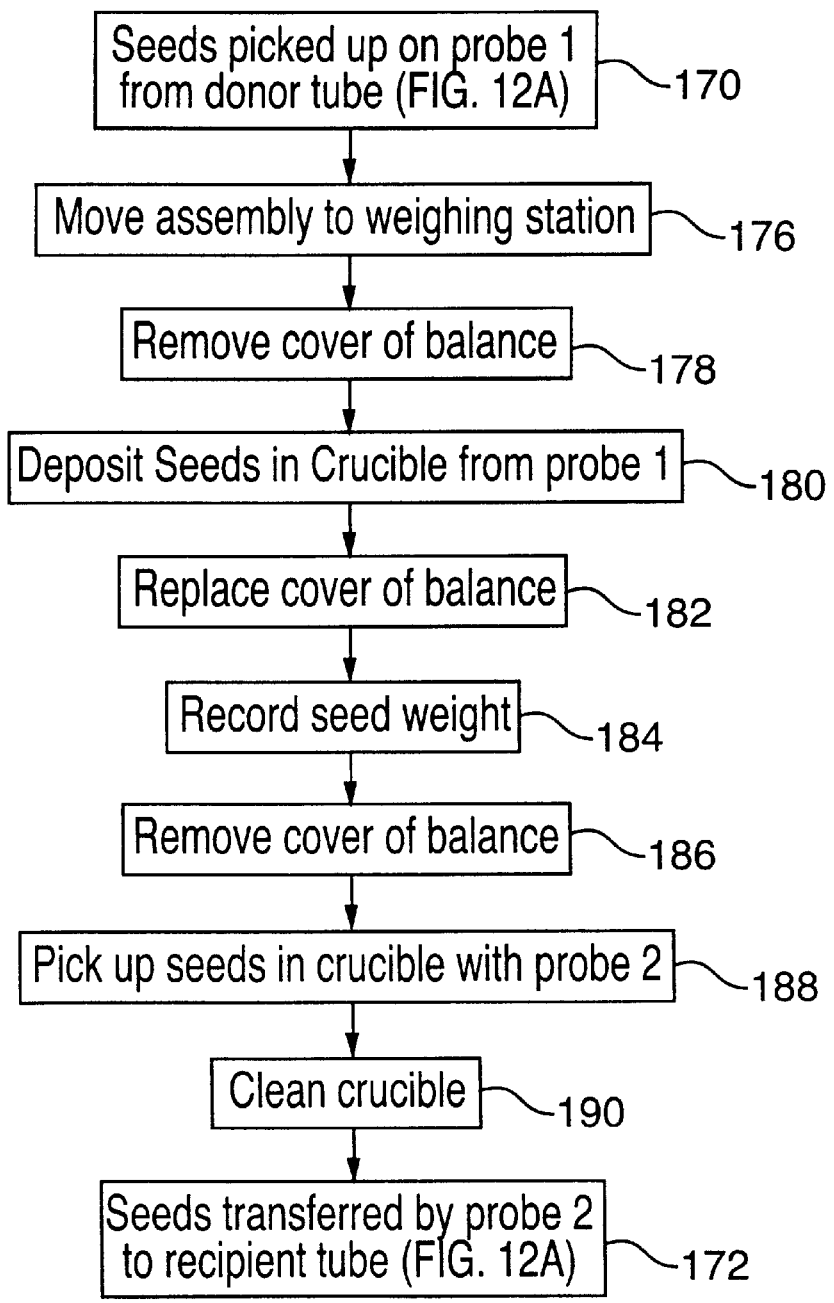
FIG. 12D is a flow diagram of the seed-weighing subroutine of FIG. 12A.

The flow diagram of the seed-sampling subroutine given in FIGS. 12A–12C involves (i) steps in removing a seed sample from a selected donor cell, shown generally at 170 in FIG. 12A, (ii) steps in depositing the seeds from the donor cell to a selected recipient cell, shown generally at 172 in FIG. 12B, and (iii) steps in cleaning the seed pick-up probe at the wash station, as shown generally at 174 in FIG. 12C. The individual steps in each of the removing, depositing, and cleaning operations are detailed in FIGS. 12A, 12B, and 12C, respectively.

With specific reference to FIG. 12A, if the user specifies that the donor jars have covers, then manipulator 30 is operated to remove the cover of the current donor jar, as indicated generally at 170a. As described, initial movement of assembly 28 to remove a cover is such as to place the jaws of manipulator 30 directly above the current jar, at which point manipulator 30 is moved downward in the z direction to a position to engage the cover. Once the manipulator has been activated to engage the jar and remove the cap from the selected jar, and with the cap held in the manipulator jaws, manipulator 30 is raised in the z direction. Assembly 28 is then shifted in its x-y position to place the appropriate seed pick-up probe directly above the now-opened jar, as indicated generally at 170b. Of course, if the donor jars do not have covers, the program skips the steps at 170a proceeds directly to the first step at 170b. In either case, the probe referred to at 170b desirably is the first probe 24 (FIGS. 4A and 4B), which, as previously explained, is designed to pick up a selected number of seeds from a tube containing typically a large number of seeds. To pick up the selected number of seeds, probe 24 is lowered in the donor jar and the vacuum supply to the device is activated so that seeds are drawn to and held by the negative pressure at the apertures 80 of the probe plate 78.

In an alternative approach, the second probe 26 may be used in lieu of the first probe 24 to withdraw seeds from the donor jar, such as when all seeds are to be removed from the container. However, when less than the total number of seeds are to be removed from a jar, it is best to use the first probe 24. This because the second probe 26, with its mesh screen, does not facilitate picking up a predetermined amount of seeds with the same accuracy as the first probe 24.

After seed pick-up from the opened jar, assembly 28 is shifted again to place manipulator 30 directly above the jar and the manipulator activated to screw the cover on the jar and release the cover from the clamp, as indicated at 170c.

As indicated at 170d of FIG. 12A, when the user specifies that the seeds being transferred are to be weighed, the control unit executes the weighing subroutine after seed pick-up from a donor jar, and before seed transfer to a recipient jar. Referring then to the weighing subroutine of FIG. 12D, seeds are initially picked up in accordance with the portion of the seed-sampling subroutine given in FIG. 12A, as indicated at 170. After seeds are picked up, assembly 28 is moved to the weighing station 84, as indicated at 176, where the cover-removal manipulator 30 is activated to engage and remove stopper 94 on the upper plate of the weighing enclosure, as indicated at 178.

With the stopper removed, the assembly is moved to align probe 24 with the opening in plate 92, the probe is lowered into the crucible 96, as shown the FIG. 6B, and the vacuum to the probe 24 is released to allow the picked-up seeds to fall off the probe plate 78 into the crucible, as indicated at 180. A slight positive pressure (e.g., from a low-pressure compressed air source) may be applied to probe 24 to facilitate seed release. The probe 24 is then lifted up out of the enclosure and the assembly and cover-removal manipulator 30 is operated to replace the stopper 94 (as indicated at 182) to isolate the chamber from air currents. After a time suitable for balance stabilization, the seeds are weighed and the weight recorded by the balance electronics unit and/or the control unit 42, as indicated at 184.

Assembly 28 is now operated to once more remove the stopper 94, as indicated at 186, and pick up the seeds in the crucible 96 by placing the second probe 26 into the crucible and applying a vacuum to the probe 26, as indicated at 188. To ensure that most or all of the seeds are removed, assembly 28 is moved through slight lateral oscillations to have the head of the probe "sweep" over the lower surface of the crucible 96 while vacuum is being applied to the probe 26.

After removing the second probe 26 from enclosure 88, and before replacing stopper 94 on the enclosure top plate 92, the crucible 96 may be cleansed of seed debris that may remain after weighing, as indicated at 190. This is may be accomplished by lowering the first probe 24 back into the crucible 96, opening the side-access of enclosure 88, and directing high-pressure (e.g., 90 psig) compressed air through the probe 24, thereby forcing debris out of the crucible, and allowing the debris to be expelled out of the open side of the enclosure. Probe 24 is then lifted out of the crucible 96, the side access closed, and the stopper 94 then replaced.

At this stage, the apparatus is operated to move the weighed seeds, now carried on second probe 26, to a selected donor jar, as detailed in the portion of the seed-sampling subroutine shown in FIG. 12B, where the probe referred to is now the second probe 26. Alternatively, the first probe 24 may be used to remove seeds from the weighing apparatus 84, although the second probe 26 can accomplish this operation much more efficiently than the first probe 24.

With reference to FIG. 12B, there is shown the portion of the seed-sampling subroutine in which seeds are deposited into the current recipient jar. As indicated generally at 172a, manipulator 30 is used to remove the cover from the recipient jar, if any, in a manner similar to that described above in connection with the steps of 170a in FIG. 12A. The seeds are then deposited in the recipient jar by releasing the vacuum from the probe and, optionally, applying a slight positive pressure to ensure release of the seeds, as indicated at 172b. Once the seeds have been deposited, the cover may be replaced, as indicated at 172c, after which the probes may be cleaned.

FIG. 12C shows a flow chart for carrying out the probe-cleaning step. This may be performed between each seed transfer from a donor to a recipient cell or, alternatively, between each transfer of seed samples from a single donor jar into two or more recipient jars. In this portion of the seed-sampling subroutine, the pick-up probe(s) are cleaned at cleaning station 104, such as by "submersion" in a compressed air bath and/or directing high-pressure air through the probes, to prevent any possibility of seed carryover. In addition, this step may involve cleaning either one probe only, where seeds are transferred but not weighed, or both probes 24, 26 simultaneously, where both transfer and weighing operations are involved. In other words, the probe referred to in FIG. 12C may be either a single probe inserted into a single cleaning port, or both probes 24, 26 moved into respective cleaning ports in a single cleaning operation. If desired, the program may exclude a probe-cleaning step, in which case the seed-sampling subroutine terminates at the last step indicated in 172c of FIG. 12B.

In an alternative method, the apparatus described herein may be used in a strictly weighing mode, where seeds in a donor tube are transferred to the weighing station 84 for weighing, and returned to the same tube after weighing.

The invention has been described with respect to particular embodiments and modes of action for illustrative purposes only. The present invention may be subject to many modifications and changes without departing from the spirit or essential characteristics thereof. We therefore claim as our invention all such modifications as come within the spirit and scope of the following claims.

We claim:

1. A robotic apparatus for handling particles, comprising:
   a robotic assembly configured to move in three-dimensional space; and
   a particle manipulator carried by the robotic assembly, the particle manipulator being positionable by the robotic assembly at selected locations in the three-dimensional space, the particle manipulator comprising a probe having an end surface defining a plurality of apertures, wherein each aperture is dimensioned smaller than a particle;
   the probe being fluidly connectable to a vacuum source, wherein application of a vacuum from the vacuum source to the probe is effective to cause the end surface of the probe to pick up particles whenever the end surface of the probe is positioned at a selected first location proximate to the particles, and wherein release of the vacuum from the probe causes the end surface of the probe to release the particles at a selected second location, wherein the second location is the same as or different from the first location.

2. The robotic apparatus of claim 1, wherein the end surface of the probe comprises a plate defining a selected number of apertures, each dimensioned smaller than a particle, and the number approximately corresponding to the number of particles to be picked up at one time by the probe, wherein application of the vacuum is effective to cause the probe to pick up approximately one particle per aperture.

3. The robotic apparatus of claim 1, wherein the end surface of the probe comprises a mesh screen having a mesh size smaller than a particle, wherein application of the vacuum is effective to cause the end surface to pick up one or more particles.

4. The robotic apparatus of claim 1, wherein the probe is a first probe, and the particle manipulator further comprises a second probe, the first probe having an end plate defining a selected number of openings for picking up a corresponding selected number of particles upon application of vacuum to the first probe, and the second probe having a fine-mesh end surface that is capable of picking up an undefined number particles, wherein the number is one or more.

5. The robotic apparatus of claim 1, wherein the probe is fluidly connected to a pressurized fluid source for selectively introducing a pressurized fluid into the probe to facilitate release of the particles from the end surface of the probe.

6. The robotic apparatus of claim 1, further comprising a cover-removal manipulator for removing and replacing a cover on a container containing the particles.

7. The robotic apparatus of claim 1, further comprising a particle-weighing device situated and configured to receive particles from the probe for weighing.

8. The robotic apparatus of claim 1, further comprising a particle-donor area and a particle-receiving area, the particle-donor area being configured to accommodate at least one donor container, and the particle-receiving area being configured to accommodate at least one recipient container, wherein the robotic assembly is configured to move the particle manipulator to the donor area to pick up particles from the donor container with the probe and to move the particle manipulator to the particle-receiving area to deposit particles from the probe in the recipient container.

9. The robotic apparatus of claim 3 wherein each aperture is about 100 to 150 microns in diameter.

10. A robotic apparatus for moving particles from a first container to a second container, comprising:
    a cover-removal manipulator for removing and replacing a cover on the first container containing the particles; and
    a particle manipulator for removing particles from the first container, the particle manipulator comprising a probe having an end surface defining at least one opening dimensioned smaller than a particle;
    the probe being connectable to a vacuum source, wherein application of a vacuum from the vacuum source to the probe is effective to cause the end surface of the probe to pick up particles whenever the end surface of the probe is positioned in the first container proximate to the particles, and the particle manipulator being configured to move the probe to the second container, wherein release of the vacuum from the probe causes the end surface of the probe to release the particles in the second container, wherein the second container can be the same or different from the first container.

11. The robotic apparatus of claim 10, wherein the cover-removal manipulator and the particle manipulator are mounted to and carried by a robotic assembly configured to move in x, y and z directions to position the cover-removal manipulator and particle manipulator at selected x-y-z positions.

12. The robotic apparatus of claim 10, wherein the cover-removal manipulator and particle manipulator are configured to move independently of each other to respective selected x-y-z positions.

13. The robotic apparatus of claim 10, further comprising a transfer area for supporting at least one donor first container and at least one recipient second container, wherein the cover-removal manipulator is configured to move to selected positions in three-dimensional space with respect to the transfer area for removing and replacing respective covers on the donor and recipient containers, and the particle manipulator is configured to move to selected positions in three-dimensional space with respect to the transfer area to remove a predetermined number of particles from the donor container and to deposit the particles to the recipient container.

14. The apparatus of claim 10, further comprising a cleaning station for cleaning the probe.

15. The apparatus of claim 14, wherein the cleaning station comprises a housing defining a port for receiving the probe, the cleaning station being connectable to a pressurized fluid source for selectively introducing a pressurized fluid into the housing for removing debris from the probe whenever the probe is inserted into the port.

16. A robotic apparatus for handling small particles, comprising:
    a robotic assembly configured to move in x, y and z directions that are mutually perpendicular to each other; and a particle manipulator carried by the robotic assembly, the particle manipulator being positionable by the robotic assembly at selected x-y-z positions, the particle manipulator comprising a first probe having an apertured surface adapted to pick up onto the surface a selected number of particles from a population of the particles, the particle manipulator also comprising a second probe having an air-pervious end surface adapted to pick up onto its respective end surface one or more particles, the first and second probes being movable independently of each other in a generally vertical direction;

the first probe being connectable to a vacuum source, wherein whenever vacuum is applied to the first probe and the apertured surface is positioned at a selected x-y-z position proximate to the population of particles, the first probe picks up the selected number of particles and thus separates the selected number of particles from the population;

the second probe being connectable to a vacuum source, wherein whenever vacuum is applied to the second probe and the end surface of the second probe is positioned at a selected x-y-z position proximate to a population of particles, the second probe picks up one or more particles.

17. The apparatus of claim 16, wherein the particles comprise a population of seeds stored in a container, and the first probe defines a selected number of apertures approximately corresponding to the selected number of seeds to be picked up from the population.

18. The apparatus of claim 17, wherein the number of apertures is in a range of about 5 to 25.

19. The apparatus of claim 17, wherein the apertures are about 100 to 150 microns in diameter.

20. The apparatus of claim 16, wherein the second probe has a meshed end surface, wherein whenever vacuum is applied to the probe of the second probe and the meshed end surface is positioned at a selected x-y-z position proximate to a population of particles, the second probe picks up an undefined number of particles from the population.

21. The robotic apparatus of claim 16, further comprising a cover-removal manipulator mounted to the robotic assembly, the cover-removal manipulator being configured for removing and replacing a cover on a container containing the particles.

22. An apparatus for transferring seeds comprising:

a robot means configured to move in three-dimensional space;

a plurality of donor containers, each containing a respective population of seeds and positioned at a respective location in three-dimensional space;

a plurality of recipient containers for receiving seeds from one or more donor containers, each recipient container being positioned at a respective location in three-dimensional space;

seed-manipulator means carried by the robot means, the robot means being configured to position the seed-manipulator means at a plurality of selected locations in three-dimensional space so as to allow the seed-manipulator means to remove a selected one or more seeds from the donor containers and to position the seed-manipulator at a plurality of selected locations in three-dimensional space so as to allow the seed-manipulator means to deposit seeds into one or more recipient containers; and a control means operatively connected to the robot means and to the seed-manipulator means, the control means being configured to cause the robot means to move the seed-manipulator means to a selected first location in three-dimensional space such that the seed-manipulator means is positioned to remove one or more seeds from a selected first donor container of said plurality of donor containers, to activate the seed-manipulator means to pick up one or more seeds from the selected donor container, to cause the robot means to move the seed-manipulator means to a selected second location in three-dimensional space such that the seed-manipulator means is positioned to deposit the picked-up seeds into a selected first recipient container of said plurality of recipient containers, and to deactivate the seed-manipulator means to deposit the picked-up seeds into the selected recipient container.

23. The apparatus of claim 22, further comprising cover-removal means for removing and replacing a cover on a container containing the seeds.

24. The apparatus of claim 22, further comprising seed-weighing means situated and configured to receive seeds from the seed-manipulator means for weighing.

25. The apparatus of claim 22, wherein the control means is configured to receive user input specifying the selected donor container from which seeds are to be removed.

26. The apparatus of claim 22, wherein the control means is configured to cause the robot means to move the seed-manipulator means to a selected third location in three-dimensional space such that the seed-manipulator means is positioned to remove one or more seeds from a selected second donor container of said plurality of donor containers, to activate the seed-manipulator means to pick up one or more seeds from the selected second donor container, to cause the robot means to move the seed-manipulator means to a selected fourth location in three-dimensional space such that the seed-manipulator means is positioned to deposit the picked-up seeds into a selected second recipient container of said plurality of recipient containers, and to deactivate the seed-manipulator means to deposit the picked-up seeds into the selected second recipient container.

27. The apparatus of claim 22, wherein the control means is configured to cause the robot means to move the seed-manipulator means to a selected third location in three-dimensional space such that the seed-manipulator means is positioned to remove one or more seeds from a selected second donor container of said plurality of donor containers, to activate the seed-manipulator means to pick up one or more seeds from the selected second donor container, to cause the robot means to move the seed-manipulator means to the selected second location in three-dimensional space such that the seed-manipulator means is positioned to deposit the picked-up seeds into the selected first recipient container, and to deactivate the seed-manipulator means to deposit the picked-up seeds into the selected first recipient container.

28. An apparatus for weighing one or more articles and for transferring the articles between recipient and donor containers, comprising:

a transfer area having a surface for supporting donor and recipient containers thereon;

a robotic assembly configured for movement over the surface of the transfer area;

a probe device carried by the robotic assembly, the probe device being configured for picking up and releasing a sample number of articles in respective containers at selected positions in the transfer area, said probe device including a first probe and a second probe, the first probe having a first-probe end plate defining a selected number of openings corresponding approximately to the number of articles to be picked up by the first probe, wherein application of vacuum to the first-probe end plate is effective to pick up approximately one article per opening, and the second probe having a second-probe end plate comprising a fine-mesh screen capable of picking up an undefined number, larger than the selected number, of articles; and a weighing station for receiving one or more articles therein from either of the first and second probes, and for weighing the received articles.

29. The apparatus of claim 28, further comprising a control unit operatively connected to the robotic assembly and to the probe device, the control unit being configured to successively activate the robotic assembly and the probe device to:

move the robotic assembly to place the first probe in a position for picking up a quantity of articles, up to the selected number, from a donor container;

activate the first probe to pick up from the donor container the quantity of articles up to the selected number, by applying a vacuum to the first probe;

move the first probe with picked-up articles to a position proximate said weighing station;

deactivate the first probe by releasing the vacuum, so as to deposit the articles carried on the first probe onto the weighing station;

weigh the articles in the weighing station;

move said robotic assembly to place the second probe in a position for picking up the articles from the weighing station;

activate the second probe by applying a vacuum thereto to pick up the articles from the weighing station; and transfer the articles picked up by the second probe to a recipient container.

30. The apparatus of claim 28, wherein the weighing station comprises a scale effective to weigh articles deposited in the weighing station in the weight range of about 10 to 500 micrograms.

31. The apparatus of claim 28, wherein the articles comprise seeds, and wherein the first probe is configured to pick up the selected number of seeds from a donor container containing a population of seeds.

32. The apparatus of claim 28, wherein the donor and recipient containers each have a respective cover, and the apparatus further comprises a cover manipulator carried by the robotic assembly, the cover manipulator being configured to engage a container cover, remove the cover, and replace the cover.

33. The apparatus of claim 28, further comprising a cleaning station situated and configured for cleaning the probe device.

34. The apparatus of claim 28, wherein the cleaning station comprises a housing defining at least one port configured for receiving one of the first and second probes, the housing being connectable to a pressurized fluid source for introducing a pressurized fluid into the housing for removing debris from a probe inserted into the port.

35. The apparatus of claim 28, wherein the probe device further comprises a pressurized gas source and a valve for selectively controlling application of gas from the gas source to the first and second probe so as to facilitate release of articles from the respective probe.

36. The apparatus of claim 28, wherein each opening is about 100 to 150 microns in diameter.

37. A robotic apparatus for handling particles, comprising:

a robotic assembly configured to move in three-dimensional space; and a particle manipulator being positionable by the robotic assembly at selected locations in the three-dimensional space, the particle manipulator comprising a first probe and a second probe, the first probe having an apertured end surface defining a selected number of openings for picking up a corresponding selected number of particles upon application of vacuum to the first probe, and the second probe having an air-pervious end surface that is capable of picking up an undefined number of particles upon application of vacuum to the second probe;

the first and second probes being fluidly connectable to a vacuum source, wherein selective application of a vacuum from the vacuum source to the probes is effective to cause the probe, and the second probe having an air-pervious end surface that is capable of picking up an undefined number of particles upon application of vacuum to the second probe;

the first and second probes being fluidly connectable to a vacuum source, wherein selective application of a vacuum from the vacuum source to the probes is effective to cause the respective end surfaces of the probes to pick up particles whenever the end surfaces are positioned proximately to the particles, and wherein release of the vacuum from the probes causes the end surfaces to release the particles therefrom.

38. The robotic apparatus of claim 37, wherein the end surface of the second probe comprises a mesh screen.

39. The robotic apparatus of claim 37, wherein the first and second probes are configured to move independently of each other to respective z positions.

40. The robotic apparatus of claim 37, wherein the end surface of the first probe has a selected number of openings dimensioned to pick up a corresponding selected number of seeds upon application of vacuum to the first probe, and the second probe has an air-pervious end surface that is capable of picking up an undefined number of seeds upon application of vacuum to the second probe.

41. An apparatus for transferring seeds, comprising:

a robotic assembly configured to move in three-dimensional space;

a plurality of donor containers, each containing a respective population of seeds and positioned at a respective location in three-dimensional space;

a plurality of recipient containers for receiving seeds from one or more donor containers, each recipient container being positioned at a respective location in three-dimensional space; and a probe carried by the robotic assembly and being fluidly connectable to a vacuum source, wherein application of a vacuum from the vacuum source to the probe is effective to cause the end surface of the probe to pick up seeds whenever the end surface is positioned proximate a population of seeds in one of said donor containers;

the robotic assembly being configured to position the probe at a plurality of different locations in three-dimensional space so as to allow the probe to remove seeds from the donor containers and to position the probe at a plurality of different locations in three-dimensional space so as to allow the seed-manipulator probe to deposit seeds into one or more recipient containers.

42. The apparatus of claim 41, further comprising a control unit operatively connected to the robotic assembly and to the probe, the control unit being configured to cause the robotic assembly to move the probe to a selected first location in three-dimensional space such that the probe is positioned to remove one or more seeds from a selected first donor container of said plurality of donor containers, to activate the probe to pick up one or more seeds from the selected donor container, to cause the robotic assembly to move the probe to a selected second location in three-dimensional space such that the probe is positioned to deposit the picked-up seeds into a selected first recipient container of said plurality of recipient containers, and to deactivate the probe to deposit the picked-up seeds into the selected recipient container.

43. The apparatus of claim 42, further comprising a seed-weighing device situated and configured to receive seeds from the probe for weighing, and wherein the control unit is configured to cause the robotic assembly to move the probe to the seed-weighing device after the probe picks up seeds from the selected first donor container, to deactivate the probe to deposit the picked-up seeds into the seed-weighing device, to activate the probe to pick up the seeds in the seed-weighing device after the seeds are weighed, and to cause the robotic assembly to move the probe to the selected second location for depositing the picked-up seeds into the selected first recipient container.

44. The apparatus of claim 42, wherein the control unit is configured to cause the robotic assembly to move the probe to a selected third location in three-dimensional space such that the probe is positioned to remove one or more seeds from a selected second donor container of said plurality of donor containers, to activate the probe to pick up one or more seeds from the selected second donor container, to cause the robotic assembly to move the probe to the selected second location in three-dimensional space such that the probe is positioned to deposit the picked-up seeds into the selected first recipient container, and to deactivate the probe to deposit the picked-up seeds into the selected first recipient container.

45. A robotic apparatus for handling seeds contained in covered or uncovered containers, comprising:

a robot operable to move in three-dimensional space;

a cover-removal manipulator coupled to the robot, the cover-removal manipulator being configured to remove and replace a cover on a container;

a seed manipulator coupled to the robot, the seed manipulator comprising first and second probes, the first probe having an end plate defining a selected number of openings sized for picking up and removing a selected number of seeds from a container upon application of a vacuum to the first probe, and the second probe having a fine-mesh end surface that is configured to pick up an undefined number, larger than the selected number, of seeds upon application of a vacuum to the second probe; and a weighing apparatus for weighing seeds removed from a container by either probe.

* * * * *

UNITED STATES PATENT AND TRADEMARK OFFICE
CERTIFICATE OF CORRECTION

PATENT NO. : 6,705,827 B2
DATED : March 16, 2004
INVENTOR(S) : Keller et al.

It is certified that error appears in the above-identified patent and that said Letters Patent is hereby corrected as shown below:

<u>Title page,</u>
Item [73], Assignee, "Aagrinomics, LLC, Portland, OR (US)" should be
-- Agrinomics, LLC, Portland, OR (US) --.

Signed and Sealed this

Sixteenth Day of May, 2006

JON W. DUDAS
*Director of the United States Patent and Trademark Office*